(12) United States Patent
Chiu et al.

(10) Patent No.: US 11,736,164 B2
(45) Date of Patent: Aug. 22, 2023

(54) BEAM ALIGNMENT WITH ACTIVE LEARNING

(71) Applicant: The Regents of the University of California, Oakland, CA (US)

(72) Inventors: Sung-En Chiu, San Diego, CA (US); Tara Javidi, San Diego, CA (US); Nancy Ronquillo, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 22 days.

(21) Appl. No.: 17/085,961

(22) Filed: Oct. 30, 2020

(65) Prior Publication Data

US 2021/0135723 A1 May 6, 2021

Related U.S. Application Data

(60) Provisional application No. 62/929,032, filed on Oct. 31, 2019.

(51) Int. Cl.
*H04B 7/06* (2006.01)
*H04B 7/08* (2006.01)
*H04B 7/0456* (2017.01)

(52) U.S. Cl.
CPC ......... *H04B 7/0617* (2013.01); *H04B 7/0456* (2013.01); *H04B 7/0632* (2013.01); *H04B 7/0634* (2013.01); *H04B 7/086* (2013.01)

(58) Field of Classification Search
CPC .. H04B 7/0617; H04B 7/0456; H04B 7/0632; H04B 7/0634; H04B 7/086; H04B 7/0478; H04B 7/0695
See application file for complete search history.

(56) References Cited

U.S. PATENT DOCUMENTS

2013/0072244 A1* 3/2013 Jeong ............... H04B 7/063 455/517
2013/0301567 A1* 11/2013 Jeong ............... H04B 7/0695 370/329

(Continued)

OTHER PUBLICATIONS

Z. Xiao, T. He, P. Xia and X.-G. Xia, "Hierarchical Codebook Design for Beamforming Training in Millimeter-Wave Communication," in IEEE Transactions on Wireless Communications, vol. 15, No. 5, pp. 3380-3392, May 2016, doi: 10.1109/TWC.2016.2520930 (Year: 2016).*

(Continued)

*Primary Examiner* — Walli Z Butt
(74) *Attorney, Agent, or Firm* — Mintz Levin Cohn Ferris Glovsky and Popeo, P.C.

(57) ABSTRACT

A beamforming vector for a communication link between a first device and a second device may be determined by searching, based on a signal from the second device, a hierarchical beamforming codebook including a plurality of beamforming vectors occupying a plurality of levels. The plurality of beamforming vectors may include a first beamforming vector and a second beamforming vector occupying a first level of the hierarchical beamforming codebook. The first beamforming vector may have a first angular range while the second beamforming vector may have a second angular range. The first beamforming vector may be selected as the beamforming vector based on a respective posterior probability an angle-of-arrival of the signal from the second device being in each of the first angular range and the second angular range. Related systems and articles of manufacture, including computer program products, are also provided.

20 Claims, 10 Drawing Sheets

(56) References Cited

U.S. PATENT DOCUMENTS

| | | | | |
|---|---|---|---|---|
| 2018/0199212 A1* | 7/2018 | Lin | ...................... | H04B 7/0619 |
| 2018/0227928 A1* | 8/2018 | Kim | ...................... | H04L 5/0023 |
| 2019/0296821 A1* | 9/2019 | Choi | ................... | H04B 7/0617 |
| 2020/0112360 A1* | 4/2020 | Krunz | ................. | H04B 7/0695 |

OTHER PUBLICATIONS

M. E. Eltayeb, A. Alkhateeb, R. W. Heath and T. Y. Al-Naffouri, "Opportunistic beam training with hybrid analog/digital codebooks for mmWave systems," 2015 IEEE Global Conference on Signal and Information Processing (GlobalSIP), 2015, pp. 315-319, doi: 10.1109/GlobalSIP.2015.7418208 (Year: 2015).*

Goswami et al. "Submillimeter wave communication versus millimeter wave communication", available online Apr. 25, 2019. (Year: 2019).*

S S Dhillon et al 2017 J. Phys. D: Appl. Phys. 50 043001 "The 2017 terahertz science and technology roadmap" (Year: 2017).*

3rd Generation Partnership Project; Technical Specification Group Radio Access Network; Evolved Universal Terrestrial Radio Access (E-UTRA) and NR: Multi-connectivity; Stage 2, 3GPP TS 37.340, 2018.

Abari, O. et al., "Millimeter Wave Communications: From Point-to-Point Links to Agile Network Connections," in Proceedings of the 15th ACM Workshop on Hot Topics in Networks—HotNets '16, 2016, pp. 169-175.

Alkhateeb, A. et al., "Channel Estimation and Hybrid Precoding for Millimeter Wave Cellular Systems," IEEE Journal of Selected Topics in Signal Processing, vol. 8, No. 5, pp. 831-846, 2014.

Chiu, S.-E. et al., "Bit-wise Sequential Coding with Feedback," in IEEE International Symposium on Information Theory, 2018.

Chiu, S.-E. et al., "Sequential measurement-dependent noisy search," in 2016 IEEE Information Theory Workshop, ITW 2016, 2016.

Choi, J. et al., "Near Maximum-Likelihood Detector and Channel Estimator for Uplink Multiuser Massive MIMO Systems with One-Bit ADCs," IEEE Transactions on Communications, vol. 64, No. 5, pp. 2005-2018, 2016.

Chung, F. et al., "Concentration Inequalities and Martingale Inequalities: A Survey," Internet Mathematics, vol. 3, No. 1, pp. 79-127, 2006.

Dasgupta, S. et al., "A general agnostic active learning algorithm," Nips, vol. 20, No. 2, pp. 353-360, 2007.

Ding, Y. et al., "Bayesian Channel Estimation Algorithms for Massive MIMO Systems with Hybrid Analog-Digital Processing and Low Resolution ADCs," IEEE Journal on Selected Topics in Signal Processing, vol. 12, No. 3, pp. 499-513, 2018.

Giordani, M. et al., "Comparative analysis of initial access techniques in 5g mmwave cellular networks," in Proceedings of the 2016 Annual Conference on Information Science and Systems (CISS), Mar. 2016, pp. 268-273.

Ho, D.K.W. et al., "Antithetic Dithered 1-bit Massive MIMO Architecture: Efficient Channel Estimation via Parameter Expansion and Pseudo Maximum Likelihood," IEEE Transactions on Signal Processing, 2019.

Kaspi, Y. et al., "Searching with Measurement Dependent Noise," IEEE Transactions on Information Theory, vol. 64, No. 4, pp. 2690-2705, 2018.

Lalitha, A. et al., "Improved Target Acquisition Rates with Feedback Codes," arXiv:1712.05865, 2017.

Li, C.T. et al., "An efficient feedback coding scheme with low error probability for discrete memoryless channels," IEEE International Symposium on Information Theory—Proceedings, vol. 61, No. 6, pp. 2953-2963, 2015.

Lin, J., "Divergence Measures Based on the Shannon Entropy," IEEE Transactions on Information Theory, vol. 37, No. 1, pp. 145-151, 1991.

Lin, X. et al., "5g new radio: Unveiling the essentials of the next generation wireless access technology," CoRR, vol. abs/1806.06898, 2018.

MacCartney, G.R. et al., "Path loss models for 5G millimeter wave propagation channels in urban microcells," GLOBECOM—IEEE Global Telecom-munications Conference, pp. 3948-3953, 2013.

Molisch, A.F. et al., "Hybrid Beamfarming for Massive MIMO: A Survey," IEEE Communications Magazine, vol. 55, No. 9, pp. 134-141, 2017.

Mukherjee, S. et al., "Analytical Calculation of Rician K-Factor for Indoor Wireless Channel Models," IEEE Access, vol. 5, pp. 19194-19212, 2017.

Naghshvar, M. et al., "Active sequential hypothesis testing," Annals of Statistics, vol. 41, No. 6, pp. 2703-2738, 2013.

Naghshvar, M. et al., "Bayesian Active Learning With Non-Persistent Noise," IEEE Transac-tions on Information Theory, vol. 61, No. 7, pp. 4080-4098, 2015.

Naghshvar, M. et al., "Extrinsic Jensen-Shannon divergence: Applications to variable-length coding," IEEE Transactions on Information Theory, vol. 61, No. 4, pp. 2148-2164, 2015.

Nayebi, E. et al., "Semi-blind channel estimation for multiuser massive MIMO systems," IEEE Transactions on Signal Processing, vol. 66, No. 2, pp. 540-553, 2017.

Rappaport, T. S. "Wireless Communications: Principles and Practice," NJ: Prentice-Hall, 2002.

Rappaport, T.S. et al., "Overview of Millimeter Wave Communications for Fifth-Generation (5G) Wireless Networks-With a Focus on Propagation Models," IEEE Transactions on Antennas and Propagation, vol. 65, No. 12, pp. 6213-6230, 2017.

Roh, W. et al., "Millimeter-wave beamforming as an enabling technology for 5G cellular communications: Theoretical feasibility and prototype results," IEEE Communications Magazine, vol. 52, No. 2, pp. 106-113, 2014.

Shabara, Y. et al., "Linear Block Cod-ing for Efficient Beam Discovery in Millimeter Wave Communication Networks," arXiv preprint arXiv:1712.07161, 2017.

Shayevitz, O. et al., "A Simple Proof for the Optimality of Randomized Posterior Matching," IEEE Transactions on Information Theory, vol. 62, No. 6, pp. 3410-3418, 2016.

Shayevitz, O. et al., "Optimal feedback communication via posterior matching," IEEE Transactions on Information Theory, vol. 57, No. 3, pp. 1186-1222, 2011.

Song, X. et al., "Efficient beam alignment for mmWave single-carrier systems with hybrid MIMO transceivers," IEEE Transactions on Wireless Communications, 2019.

Tse, D. et al., "Fundamentals of Wireless Communication, Chapter 07: MIMO I: spatial multiplexing and channel modeling," Cambridge University Press, 2005.

Va, V. et al., "The Impact of Beamwidth on Temporal Channel Variation in Vehicular Channels and Its Implications," IEEE Transactions on Vehicular Technology, vol. 66, No. 6, pp. 5014-5029, 2017.

Yan, S. et al., "Active Learning from Imperfect Labelers," in Advances in Neural Information Processing Systems (NIPS), 2016.

* cited by examiner

BEAM ALIGNMENT WITH ACTIVE LEARNING

RELATED APPLICATION

This application claims priority to U.S. Provisional Application No. 62/929,032 entitled "MILLIMETER WAVE ALIGNMENT" and filed on Oct. 31, 2019, the disclosure of which is incorporated herein by reference in its entirety.

TECHNICAL FIELD

The subject matter described herein relates generally to wireless communication and more specifically to an active learning strategy for beam alignment.

BACKGROUND

A transmitter and a receiver in a communication system may engage in wireless communication by exchanging electromagnetic signals in the radio spectrum. With a large swathe of available bandwidth capable of supporting high data rates, higher frequency bands, such as the 3 gigahertz to 100 gigahertz band associated with microwaves and millimeter waves as well as the 0.1 terahertz to 30 terahertz band, may be particularly attractive for realizing communication networks with high speed and high capacity requirements.

SUMMARY

Systems, methods, and articles of manufacture, including computer program products, are provided for beam alignment. In some example embodiments, there is provided a system that includes at least one processor and at least one memory. The at least one memory may include program code that provides operations when executed by the at least one processor. The operations may include: determining a beamforming vector for a communication link between a first device and a second device, the determining includes searching, based at least on a signal from the second device, a hierarchical beamforming codebook including a plurality of beamforming vectors occupying a plurality of levels, the plurality of beamforming vectors including a first beamforming vector and a second beamforming vector occupying a first level of the hierarchical beamforming codebook, the first beamforming vector having a first angular range and the second beamforming vector having a second angular range, the searching of the hierarchical beamforming codebook includes selecting, based at least on a respective posterior probability an angle-of-arrival of the signal from the second device being in each of the first angular range and the second angular range, the first beamforming vector instead of the second beamforming vector as the beamforming vector; and establishing, based at least on the beamforming vector, the communication link between the first device and the second device.

In some variations, one or more features disclosed herein including the following features can optionally be included in any feasible combination. The plurality of beamforming vectors may further include a third beamforming vector occupying a second level of the hierarchical beamforming codebook. A third angular range of the third beamforming vector may be a union of the first angular range of the first beamforming vector and the second angular range of the second beamforming vector.

In some variations, a posterior probability associated with the first beamforming vector and/or the second beamforming vector may be updated based at least on a quality of the signal received at the first device with the first beamforming vector.

In some variations, the first beamforming vector may be selected instead of the second beamforming vector based at least on a first posterior probability associated with the first beamforming vector being closer to a threshold value than a second posterior probability associated with the second beamforming vector.

In some variations, the first beamforming vector may be selected as the beamforming vector for the communication link upon reaching a threshold quantity of frames during which the second device transmits the signal.

In some variations, the first beamforming vector may be selected as the beamforming vector based at least on a quality of the signal associated with the first beamforming vector exceeding a threshold value.

In some variations, the first device and the second device may each include a plurality of antennas coupled with a radio frequency (RF) chain. The beamforming vector may be applied to combine a plurality of signals received at the plurality of antennas.

In some variations, the communication link may operate in a 3 gigahertz to 100 gigahertz band and/or a 0.1 terahertz to 30 terahertz band. The signal may include microwaves, millimeter waves, and/or sub-millimeter waves.

In some variations, the beamforming vector may be determined during an initial access phase.

In some variations, the first device may be a base station and the second device may be a mobile device.

In another aspect, there is provided a method for beam alignment. The method may include: determining a beamforming vector for a communication link between a first device and a second device, the determining includes searching, based at least on a signal from the second device, a hierarchical beamforming codebook including a plurality of beamforming vectors occupying a plurality of levels, the plurality of beamforming vectors including a first beamforming vector and a second beamforming vector occupying a first level of the hierarchical beamforming codebook, the first beamforming vector having a first angular range and the second beamforming vector having a second angular range, the searching of the hierarchical beamforming codebook includes selecting, based at least on a respective posterior probability an angle-of-arrival of the signal from the second device being in each of the first angular range and the second angular range, the first beamforming vector instead of the second beamforming vector as the beamforming vector; and establishing, based at least on the beamforming vector, the communication link between the first device and the second device.

In some variations, one or more features disclosed herein including the following features can optionally be included in any feasible combination. The plurality of beamforming vectors may further include a third beamforming vector occupying a second level of the hierarchical beamforming codebook. A third angular range of the third beamforming vector may be a union of the first angular range of the first beamforming vector and the second angular range of the second beamforming vector.

In some variations, the method may further include updating, based at least on a quality of the signal received at the first device with the first beamforming vector, a posterior probability associated with the first beamforming vector and/or the second beamforming vector.

In some variations, the first beamforming vector may be selected instead of the second beamforming vector based at least on a first posterior probability associated with the first beamforming vector being closer to a threshold value than a second posterior probability associated with the second beamforming vector.

In some variations, the first beamforming vector may be selected as the beamforming vector for the communication link upon reaching a threshold quantity of frames during which the second device transmits the signal.

In some variations, the first beamforming vector may be selected as the beamforming vector based at least on a quality of the signal associated with the first beamforming vector exceeding a threshold value.

In some variations, the first device and the second device may each include a plurality of antennas coupled with a radio frequency (RF) chain. The beamforming vector may be applied to combine a plurality of signals received at the plurality of antennas.

In some variations, the communication link may operate in a 3 gigahertz to 100 gigahertz band and/or a 0.1 terahertz to 30 terahertz band. The signal may include microwaves, millimeter waves, and/or sub-millimeter waves.

In some variations, the beamforming vector may be determined during an initial access phase.

In another aspect, there is provided a computer program product that includes a non-transitory computer readable medium storing instructions. The instructions may cause operations when executed by at least one data processor. The operations may include: determining a beamforming vector for a communication link between a first device and a second device, the determining includes searching, based at least on a signal from the second device, a hierarchical beamforming codebook including a plurality of beamforming vectors occupying a plurality of levels, the plurality of beamforming vectors including a first beamforming vector and a second beamforming vector occupying a first level of the hierarchical beamforming codebook, the first beamforming vector having a first angular range and the second beamforming vector having a second angular range, the searching of the hierarchical beamforming codebook includes selecting, based at least on a respective posterior probability an angle-of-arrival of the signal from the second device being in each of the first angular range and the second angular range, the first beamforming vector instead of the second beamforming vector as the beamforming vector; and establishing, based at least on the beamforming vector, the communication link between the first device and the second device.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
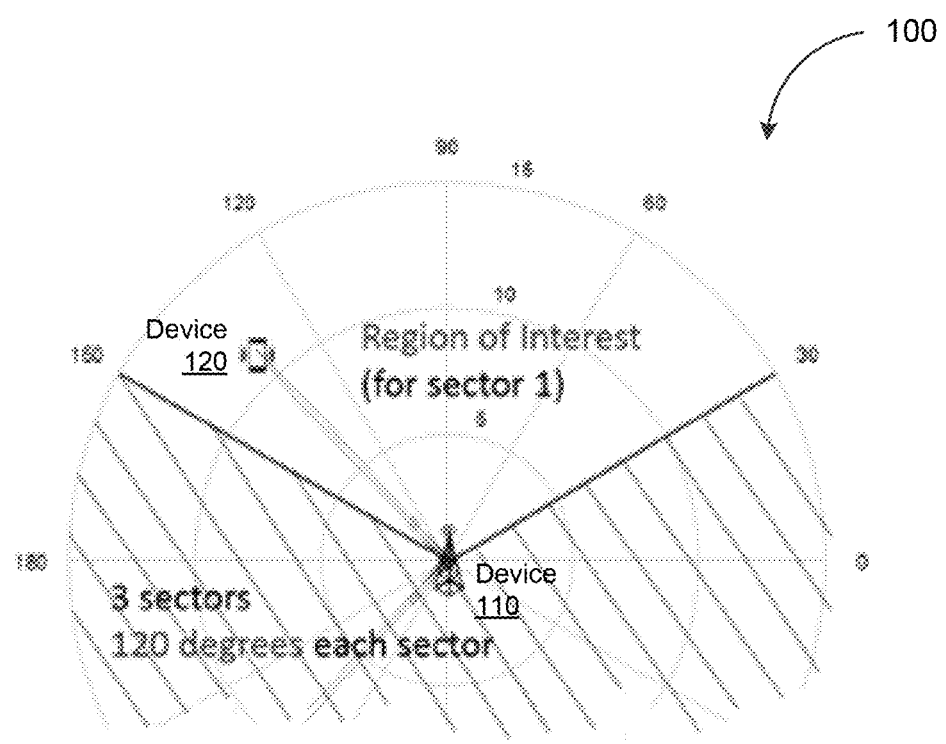
FIG. 1 depicts a system diagram illustrating an example of a communication system, in accordance with some example embodiments.

Higher frequency bands, such as the 3 gigahertz to 100 gigahertz band and the even higher frequency 0.1 terahertz to 30 terahertz band, may be capable of supporting high data rates. However, the transmission of shorter wavelength signals, such as millimeter waves and sub-millimeter waves, may be more prone to pathloss because shorter wavelength signals are more susceptible to attenuation and interference. To minimize the pathloss associated with a high frequency communication link between a transmitter and a receiver, antenna arrays with large quantities of antennas may be deployed at the transmitter and the receiver. Such multiple-input-multiple-output (MIMO) communication systems may be configured to exchange highly directional beams, which may increase the signal-to-noise ratio (SNR) of the high frequency communication link and decrease the frequency of link outage.

To achieve a highly directional beam from a transmitter to a receiver may require a precise and reliable estimate of a channel state information (CSI) during an initial access phase. Where a single radio frequency (RF) chain is deployed to support multiple antennas, the acquisition of channel state information may be analogous to identifying an optimal beam pattern along a dominant direction of the signal exchanged between the transmitter and the receiver. For example, an optimal beam pattern, such as abeam pattern providing a signal with maximum power, may be identified by searching a beamforming codebook including a set of different beam patterns and measuring a quality of the signal associated with the different beam patterns. An exhaustive linear search that examines every beam pattern present in the beamforming codebook to identify an optimal beam pattern may impose an excessively long initial access time. This initial access time may grow linearly with the angular resolution of the beam patterns included in the beamforming codebook, with the maximum angular resolution corresponding to the quantity of antennas.

As such, in some example embodiments, an optimal beam pattern for a communication link between a transmitter and a receiver may be identified by applying a hierarchical posterior matching search of a hierarchical beamforming codebook in which a set of beam patterns are organized into successive levels of increasing angular resolution. For example, one level of the hierarchical beamforming codebook may include a first beam pattern that is a union of a second beam pattern and a third beam pattern occupying a subsequent level of the hierarchical beamforming codebook. Moreover, the search of the hierarchical beamforming codebook may be performed based on a posterior probability of the optimal beam pattern being within an angular range of the beam patterns occupying each level of the hierarchical beamforming codebook. For instance, the search to the subsequent level of the hierarchical beamforming codebook may be performed based at least on a respective posterior probability of the optimal beam pattern being within an angular range of the second beam pattern and an angular range of the third beam pattern. These posterior probabilities may be updated based on subsequent measurements of the quality of the signal that is encountered with the second beam pattern and/or the third beam pattern.

FIG. 1 depicts a system diagram illustrating an example of a communication system 100, in accordance with some example embodiments. Referring to FIG. 1, the communication system 100 may include a first device 110 and a second device 120 engaged in wireless communication, for example, by exchanging signals in high frequency bands such as the the 3 gigahertz to 100 gigahertz band associated with microwaves and millimeter waves as well as the 0.1 terahertz to 30 terahertz band. In the example shown in FIG. 1, the first device 110 may be a base station and the second device 120 may be a mobile device. Moreover, the first device 110 may transmit to and/or receive from the second device 120 one or more short wavelength signals including, for example, millimeter waves, sub-millimeter waves, and/or the like.

The first device 110 and the second device 120 may each include an array of multiple antennas that is coupled with a single radio frequency (RF) chain. A robust communication link between the first device 110 and the second device 120 may require the first device 110 and the second deice 120 to perform a beam alignment, which enables the first device 110 and the second device 120 to exchange highly directional beams that increase the signal-to-noise ratio (SNR) of the high frequency communication link and decrease the frequency of link outage. For example, the power of a directional beam from the first device 110 to the second device 120 may be at a maximum towards a location of the second device 120. To achieve a highly directional beam from the first device 110 to the second device 120, the first device 110 may require a precise and reliable estimate of a channel state information (CSI) during an initial access phase. For instance, during the initial access phase, the first device 110 may determine an angle-of-arrival (AoA) of a signal (e.g., a pilot signal and/or the like) sent from the second device 120 to the first device 110.

The first device 110 may determine the angle-of-arrival (AoA) of the signal from the second device 120 to the first device 110 by at least searching a beamforming codebook to identify an optimal beam pattern providing a signal with maximum power. For example, the first device 110 may measure the quality of the signal associated with the different beam patterns to identify a beam pattern that maximizes the power of the signal (e.g., the pilot signal and/or the like) the first device 110 receives from the second device 120. However, as noted, an exhaustive linear search of the beamforming codebook in which the first device 110 examines every beam pattern present in the beamforming codebook may impose an excessively long initial access time.

Figure 2:
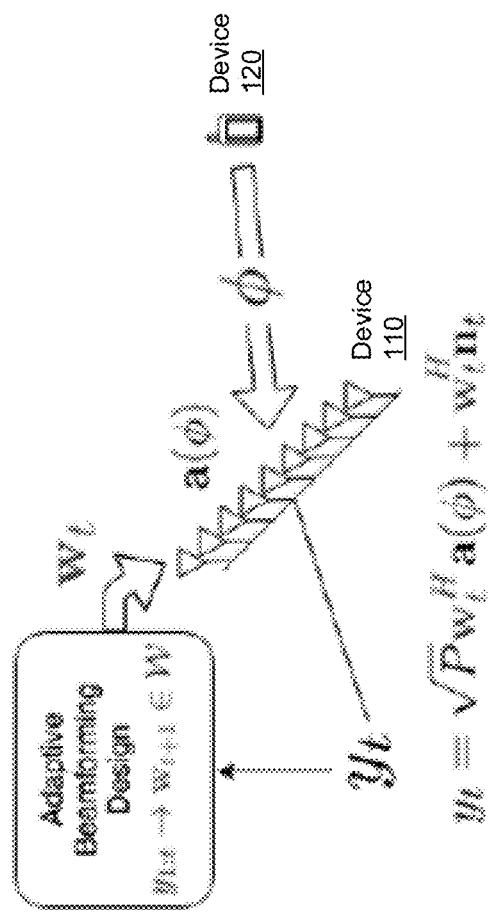
FIG. 2 depicts a schematic diagram illustrating an example of beam alignment with active learning, in accordance with some example embodiments.

Accordingly, as shown in FIG. 2, the first device 110 may actively learn the angle-of-arrival $\phi$ of the signal from the second device 120 by determining, based at least on a sequential collection of the observations $y_t$, one or more beams $w_t \in W^S$ for estimating the angle-of-arrival $\phi$. For example, in some example embodiments, the first device 110 may perform a search of a hierarchical beamforming codebook in which a set of beam patterns are organized into successive levels of increasing angular resolution.

Figure 3:
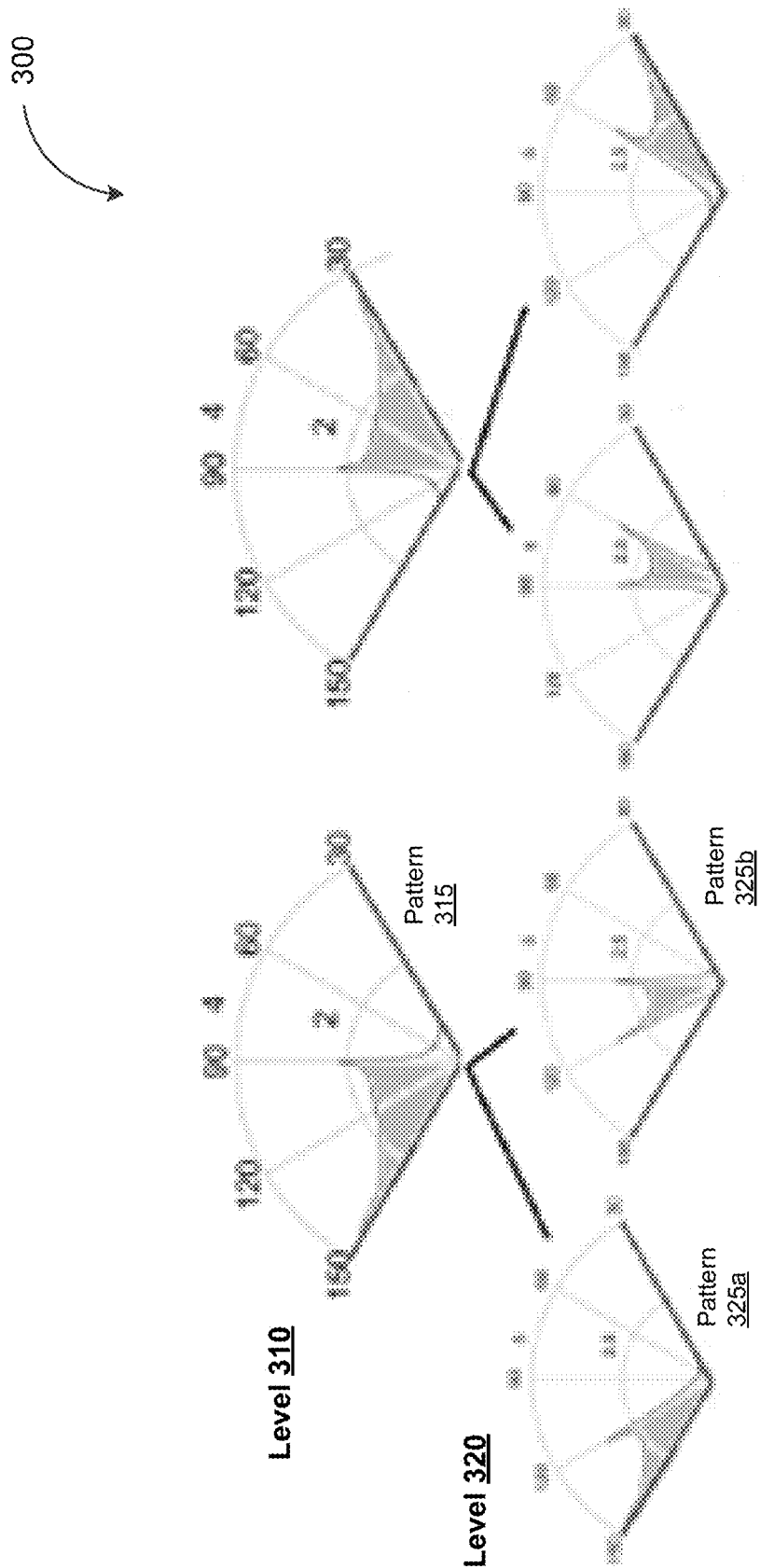
FIG. 3 depicts a schematic diagram illustrating an example of a hierarchical beamforming codebook, in accordance with some example embodiments.

FIG. 3 depicts a schematic diagram illustrating an example of an hierarchical beamforming codebook 300, in accordance with some example embodiments. As shown in FIG. 3, a first level 310 of the hierarchical beamforming codebook 300 may include a first beam pattern 315 that is a union of a second beam pattern 325a and a third beam pattern 325b occupying a second level 320 of the hierarchical beamforming codebook 300. Moreover, the search of the hierarchical beamforming codebook 300 may be performed based on a posterior probability of the optimal beam pattern being within an angular range of the beam patterns occupying each level of the hierarchical beamforming codebook. For instance, the search from the first level 310 to the second level 320 of the hierarchical beamforming codebook may be informed based at least on a respective posterior probability of the optimal beam pattern being within an angular range of the second beam pattern 325a and an angular range of the third beam pattern 325b. The first device 110 may further update these posterior probabilities based on subsequent measurements of the quality of the signal that is encountered with the second beam pattern 325a and/or the third beam pattern 325b.

Referring again to FIG. 1, the communication system 100 may be a sectorized cellular communication system operating in, for example, the 3 gigahertz to 100 gigahertz band associated with microwaves and millimeter waves, the 0.1 terahertz to 30 terahertz band, and/or the like. As shown in FIG. 1, the first device 110 may be a base station serving mobile devices, such as the second device 120, in the angular range [θ1, θ2] (e.g., from 30° to 160°) with minimal interference within the same sector and between adjacent sectors due to the high pathloss associated with the extremely high frequency and tremendously high frequency bands as well as the orthogonality (e.g., in time and/or code) of the transmissions within the same sector.

As noted, each of the first device 110 and the second device 120 may include a multi-antenna array coupled with a single radio frequency (RF) chain. Beamforming may be applied on the antenna elements such that the power gain due to beamforming may compensate for the high pathloss associated with the high frequency communication link between the first device 110 and the second device 120. For example, the second device 120 may send a signal (e.g., a pilot signal and/or the like) to the first device 110 such that the first device 110 may combine, based on a beamforming vector $w_t \in C^N$, the signal that is received at each antenna in the multi-antenna array at the first device 110. Beam alignment between the first device 110 and the second device 120 may include determining, at the first device 110, the beamforming vector $w_t \in C^N$ capable of achieving a threshold quality communication link. It should be appreciated that the beamforming vector $w_t \in C^N$ may assumed to be fixed at the second device 120 such that the multi-antenna array at the second device 120 may be modeled as a single virtual antenna.

As used herein, boldface letters may denote vectors and the notation [n] may serve as a shorthand for the discrete set $\{1, 2, \ldots n\}$. The space of probability mass functions on the set X may be denoted as $P_{(X)}$. The Kullback-Leibler (KL) divergence between the distributions P and Q may be denoted by $$D(P\|Q) = \Sigma_x P(x) \log \frac{P(x)}{Q(x)}.$$

The mutual information between random variables X and Y may be defined as $$I(X, Y) = \Sigma_{x,y} p(x, y) \log \frac{p(x, y)}{p(x)p(y)},$$

wherein p(x,y) may be the joint distribution while p(x) and p(y) may be the marginals of the random variables X and Y. Moreover, Bern(p) may denote the Bernoulli distribution with the parameter p and I(q; p) may denote the mutual information between the input X~Bern(q) and the output Y of a binary symmetric channel (BSC) with crossover probability p. The expression $C_1(p) := D(\text{Bern}(p) \| \text{Bern}(1-p))$ may denote the error exponent of hypothesis testing of the Bernoulli distributions Bern(p) versus Bern(1−p). Meanwhile, $C\mathcal{N}(\mu, \Sigma)$ may denote a multivariate complex Gaussian distribution and $C\mathcal{N}(x; \mu, \Sigma)$ with a mean μ and a covariance matrix Σ. The expression Rice(μ, σ²) may denote a Rician distribution while $$\text{Rice}(x; \mu, \sigma^2) := \frac{x}{\sigma^2} \exp\left(\frac{-(x^2 + \mu^2)}{2\sigma^2}\right) J_0\left(\frac{x\mu}{\sigma^2}\right)$$

may denotes its probability density function in which $J_0(\bullet)$ is the modified Bessel function of the first kind with order zero.

In the example of the communication system shown in FIGS. 1-2, N may be the quantity of antennas at the first device 110, $\sqrt{P}$ may denote the combined effect of transmit power and large-scale fading (e.g., pathloss, shadowing, and/or the like), and $h \in C^N$ may denote the small-scale frequency flat fading vector (e.g., where hi may be the small-scale fading between the single virtual antenna of the second device 120 and the i-th antenna element at the first device 110). For small-scale channel modelling, stochastic multi-path modelling assumption may be applied with a single dominant path. Moreover, the mobility of the second device 120 may be assumed to be negligible, which may render the channel vector h time invariant.

The foregoing assumptions may be summarized as follows. First, under Assumption 1, the small scale channel may be described by Equation (1) below.

$$h = \alpha a(\phi) \tag{1}$$

wherein $\alpha \in C$ may be the fading coefficient. Equation (2) below expresses the array manifold $a(\phi)$ that is created by the angle-of-arrival (AoA) $\phi \in [\theta_1, \theta_2]$ with antenna spacing d. The fading coefficient α and the angle-of-arrival φ may be assumed to be static in time.

$$a(\phi) := \left[1, e^{j\frac{2\pi d}{\lambda}\sin\phi}, \ldots, e^{j(N-1)\frac{2\pi d}{\lambda}\sin\phi}\right] \tag{2}$$

The time index t=1, 2, . . . may be the time frame in which the first device 110 can adapt the beamforming vector $w_t$. Each beamforming frame itself may be further divided into K slots of finer granularity either in time (e.g. code-division multiple access (CDMA)) and/or in frequency (e.g. orthogonal frequency division multiplexing (OFDM) subcarriers) where a spread sequence $\{s_k^{(i)}\}_{k=1}^K$ is associated with each mobile device (i) such as, for example, the second device 120. Orthogonal spread sequences may be used amongst different mobile devices among users, which gives rise to the second assumption (Assumption 2) that each mobile device, such as the second device 120, uses a spreading sequence $s_k$ such that $\Sigma_k s_k s_k^* = 1$. Moreover, as show in Equation (3) below, the spreading sequence between two different mobile devices s and s' may be orthogonal.

$$\Sigma_k s_k s_k' = 0 \tag{3}$$

With this assumption of orthogonality amongst individual mobile devices, correlating the pilot codes from each mobile device may enable the code-matched signal the first device 110 receives from each individual mobile device, such as the second device 120, to be expressed as Equation (4) below.

$$y_t \overset{(a)}{=} \sum_{k=1}^{K} \sqrt{P} w_t^H h s_k s_k^* + w_t^H \sum_{k=1}^{K} n_{t,k} s_k^* \quad (4)$$

$$\overset{(b)}{=} \alpha \sqrt{P} w_t^H a(\phi) + w_t^H n_t,$$

wherein $n_{t,k} \sim \mathcal{CN}(0_{N\times 1}, \sigma^2 I)$ may denote the spatially uncorrelated additive white Gaussian noise (AWGN) at the antenna elements (e.g., assuming that $n_{t,k}$ is independently and identically distributed across t and k). Note that the first equality (a) in Equation (4) above may rely on the orthogonality of spread sequences amongst different mobile devices as well as the channel h being static over the code resource k whereas the second equality (b) in Equation (4) may rely on the assumption of a single-path channel model as well as the assumption that $\Sigma_k s_k s_k^* = 1$. Finally, $n_t := \Sigma_k n_{t,k} s_k^* \sim \mathcal{CN}(0_{N\times 1}, \sigma^2 I)$ may denote the equivalent noise at the output of the code-matched filter, such that $y_t$ may have a raw signal to noise ratio (SNR) of a raw SNR equal to $P/\sigma^2$ in the absence of beamforming.

In many practical scenarios, only a partial information about $y_t$ may be available to the first device 110. Accordingly, the signal $z_t$ that is available to the first device 110 may be expressed as Equation (5) below.

$$z_t = q(y_t) \quad (5)$$

wherein $q(\bullet)$ may represent a practically partial information processing such quantization function. A sequential beam alignment process that adaptively forms the beamforming vector $w_t$ may be described based on the received signal models of Equations (4) and (5).

In some example embodiments, a sequential beam alignment process that is performed during an initial access phase may include a beamforming design strategy (possibly adaptive), a stopping time τ, and a final beamforming vector $w_t$. In particular, a stationary beamforming strategy may be considered as a causal (possibly random) mapping function from past observations to the beamforming vector $w_{t+1} = \gamma(z_{1:t}, w_{1:t})$. The final beamforming vector selection $b(\bullet)$ may be a (possibly random) mapping determining the final beamforming vector to be exploited for communication, $\hat{w} = b(z_{1:\tau}, w_{1:\tau})$, as a function of the sequence of the observations gathered during the initial access phase [1:τ]. To reduce the reconfiguration time of the beamforming vector from $w_t$ to $w_{t+1}$, a beamforming codebook including a predetermined selection of beam patterns may be used. A third assumption (Assumption 3) may therefore be that the beamforming vector $w_t$ may be chosen from a beamforming codebook $W^S$ having a finite cardinality.

In some example embodiments, the length of the initial access phase may depend on whether the first device 110 performs the beam alignment constrained by a fixed-length stopping time. When a fixed-length stopping time is imposed, the second device 120 may transmit a signal (e.g., a pilot signal and/or the like) for a predetermined quantity of frames T during which time the first device 110 uses the beamforming vectors $w_1, w_2, w_T$. Upon reaching the predetermined quantity of frame T, the first device 110 may make a prompt decision on the final beamforming vector A. Alternatively, where the stopping time is variable, the second device 120 may continue to send out a signal (e.g., a pilot signal and/or the like) until the first device 110 is able to identify a final beamforming vector A that is capable of providing a threshold quality communication link with a threshold probability. Under the variable-length setup, the first device 110 may send, to the second device 120, an indication (e.g., an acknowledgement (ACK) message) at the end of the end of the initial access phase when the first device 110 is able to identify the final beamforming vector $\hat{w}$.

Since an optimal beamforming vector $\hat{w} = a(\phi)$ may be capable of boosting the signal to noise ratio (SNR) of a communication link by a factor of N, the fading coefficient α may also be estimated and equalized if the signal to noise ratio at the radio frequency (RF) chain coupled to the antenna array is sufficiently high. Therefore, given Assumption 1 above, one objective of the initial access phase may be to learn the angle-of-arrival (AoA) $\phi$ such that the first device 110 may form a highly directional beam towards a direction corresponding to the angle-of-arrival $\phi$. Accordingly, as shown in FIG. 2, an active leaning technique may be applied to the sequential beam alignment process, wherein the beamforming vector $w_t$ may be equivalent to the query point and $y_t$ may correspond to the response to the active learning. The adaptivity of the beamforming vector $w_t$ may indicate that the query points are actively chosen as considered in the active learning tasks.

The quality of the established link between the first device 110 and the second device 120, under a single-path channel model $h = a(\phi)$, may be determined by the accuracy of the final point estimate $\hat{\phi}(y_{1:\tau}, w_{1:\tau})$ of $\phi$. In particular, a point estimate $\hat{\phi}$ together with a confidence interval δ may provide a robust beamforming with certain outage probability. Hence, the performance of the communication link between the first device 110 and the second device 120 may be measured by the resolution and reliability of the final estimate $\hat{w}$.

Under Assumption 1, a sequential beam search strategy with an adaptive beamforming design γ, stopping time τ, and a final angle-of-arrival estimation $\hat{\phi}$ may be said to have resolution 1/δ with an error probability of E if Equation (6) below is true.

$$\mathbb{P}(|\hat{\phi} - \phi| > \delta) \leq \epsilon \quad (6)$$

Given sufficiently large quantity of antennas, the resolution 1/δ may be increased and the error probability c may be decreased by increasing the time of sample collection τ and/or by prolonging the initial access phase. In other words, the effectiveness of an initial access algorithm may also be measured by the expected quantity of samples $\tau_{\epsilon,\delta}$ necessary to ensure a resolution of $$\frac{1}{\delta}$$

and an error probability ϵ. From an information theoretic viewpoint, one can think of a family of sequential adaptive initial access schemes that achieves acquisition rate R and reliability E. For example, under Assumption 1, a family of sequential adaptive initial access schemes may achieve an acquisition rate-reliability (R, E) if and only if $$R := \lim_{\delta \to 0} \frac{\log\left(\frac{1}{\delta}\right)}{\mathbb{E}[\tau_{\epsilon,\delta}]}, E := \lim_{\epsilon \to 0} \frac{\log\left(\frac{1}{\epsilon}\right)}{\mathbb{E}[\tau_{\epsilon,\delta}]}. \quad (7)$$

The final beamforming vector $\hat{w}$ as well as the quality of the established communication link may determined by the target resolution 1/δ and the error (δ, ϵ), written as $\hat{w}(z_{1:\tau}, w_{t:\tau}, \epsilon, \delta)$. Given a total communication time frame T, the expected data transmission rate, under the final beamforming vector $\hat{w}$, may be given by Equation (8) below.

$$\mathbb{E}\left[\frac{T-\tau}{T}\log\left(1+\frac{P|\alpha\hat{w}(z_{1:\tau}, w_{1:\tau}, \epsilon, \delta)^H a(\phi)|^2}{\sigma^2}\right)\right] \quad (8)$$

Data transmission rate may be an important performance metric from a system point of view. It should be appreciated that this performance metric may be subject to further system optimization over the length of the initial access phase, $\tau$, and the length of the communication phase, T. A comparison between different initial beam alignment algorithms may nevertheless be evaluated, based on Equation (8), with some nominal choice of $\tau$ and T.

In some example embodiments, to determine the final beamforming vector $\hat{w}$, the first device 110 may search a hierarchical beamforming codebook $W^S$ with S levels of beam patterns in which the beam patterns occupying each level of the codebook divides the angular space dyadically and in a hierarchical manner such that the disjoint union of the beam patterns in each level may cover a the whole region of interest (e.g., the sector served by the first device 110). For the S quantity of levels $W^S = \cup_{i=1}^{S} W_i$, $W_l$ may denote the beam patterns whose main beam has a width of $$\frac{|\Theta_2 - \Theta_1|}{2^l}.$$

For each level l, $W_l$ may contain a $2^l$ quantity of beamforming vectors that divide the sector $[\theta_1, \theta_2]$ into a $2^l$ quantity of directions that are each associated with a certain range of angle-of-arrival $D_l^k$ as set forth in Equation (9) below. The beam-forming vector $w(D_l^k)$ may be designed such that the beamforming gain $|(D_l^k)^H a(\phi)|$ is substantially constant for angle-of-arrival $\phi \in D_l^k$ and almost zero for $\phi \notin D_l^k$.

$$|\Theta_2 - \Theta_1| = \cup_{k=1}^{2^l} D_l^k, \quad (9)$$

It should be appreciated that the hierarchical beamforming codebook $W^S$ may be represented as a binary hierarchical tree, where each beam pattern occupying level l may have two descendants in a subsequent level l+1 such that each beam pattern occupying level l is a union of two disjoint beams (e.g., $D_l^k = D_{l=1}^{2k} \cup D_{l=1}^{2k-1}$). Moreover, without loss of generality, the beamforming vectors in the codebook may be assumed to have unit norm $\|w\|^2 = 1$.

Figure 4:
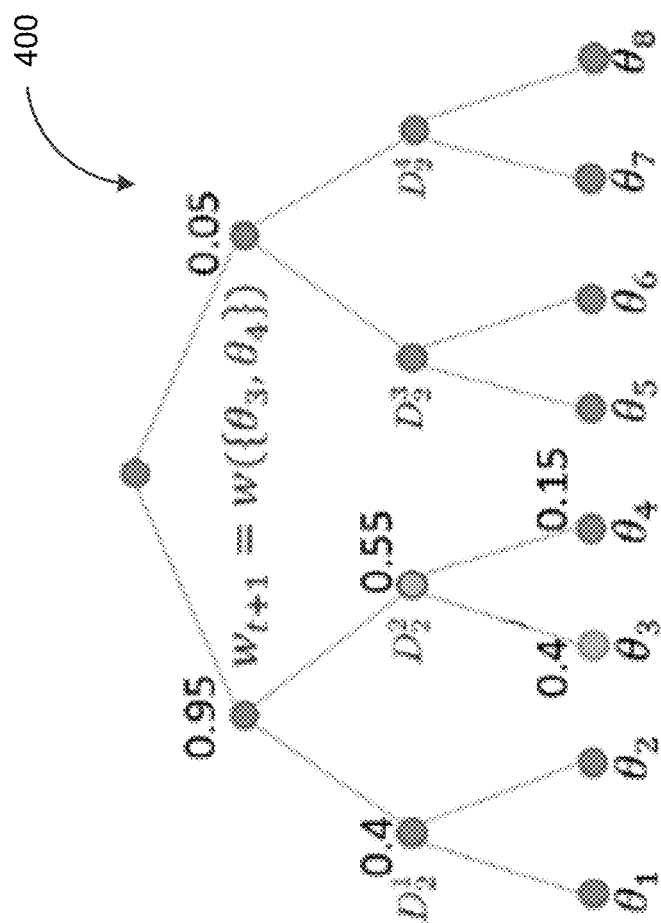
FIG. 4 depicts a schematic diagram illustrating an example of a hierarchical posterior matching algorithm, in accordance with some example embodiments.

To further illustrate, FIG. 4 depicts a schematic diagram illustrating an example of a hierarchical posterior matching algorithm, in accordance with some example embodiments. For example, FIG. 4 depicts an example of a binary tree hierarchy 400 that includes, for example, beam patterns from the first two levels of the hierarchical beamforming codebook. FIG. 4 further depicts a search down the tree hierarchy 400 to levels 2 and 3, where level 3 has the first codeword that contains posterior lesser than half. Between level 2 and level 3, the codeword in level 2 of posterior 0.55 may be selected since it's closer to the threshold value ½ (e.g., 0.55 v.s. 0.4)

In some example embodiments, the first device 110 may form the final beamforming vector $\hat{w}$ by at least searching the hierarchical beamforming codebook $W^S$. Instead of using all past observations $w_{t+1} = \gamma(z_{1:t}, w_{1:t})$, the first device 110 may apply a hierarchical posterior matching algorithm in which the beamforming vector $w_{t+1}$ is selected from a subsequent level of the codebook based on a posterior of the angle-of-arrival $\phi$ at time t, which is a sufficient statistic. The problem may be discretized by assuming that the resolution $$\frac{1}{\delta}$$

is an integer and that the angle-of-arrival $\phi$ is from Equation (10) below.

$$\varphi \in \left\{\theta_1, \ldots, \theta_{\frac{1}{\delta}}\right\}, \theta_i = \Theta_1 + (i-1) \times \delta \times (\Theta_2 - \Theta_1) \quad (10)$$

Such discretization may approach the original problem of initial access as $\delta \to 0$. To support this level of resolution, the corresponding size of the hierarchical beamforming codebook may be defined by Equation (11).

$$S = \log_2(1/\delta) \quad (11)$$

With this discretization, the posterior distribution may be written as a $$\frac{1}{\delta}\text{-dimensional vector } \pi(t)$$

as shown in Equation (12).

$$\pi_i(t) := \mathbb{P}(\phi = \theta_i \mid z_{1:t}, w_{1:t}), i = 1, 2, \ldots, \frac{1}{\delta}, \quad (12)$$

The posterior probability of the angle-of-arrival $\phi$ being in a certain angular range, such as $D_l^k$, may be computed in accordance with Equation (13).

$$\pi_{D_l^k}(t) := E_{\theta_i \in D_l^k} \pi_i(t), \quad (13)$$

As noted, the first device 110 may apply a hierarchical posterior matching search algorithm when searching the hierarchical beamforming codebook $W^S$. Accordingly, the first device 110 may select, at each time t, a beamforming vector from the hierarchical beamforming codebook $W^S$. The selection of $w_{t+1} \in W^S$ may be made by examining the posterior probability $\pi_{D_l^k}(t)$ for all l=1, 2, . . . , S and k=1, 2, . . . , $2^l$. For example, given Equation (14) below, the first device 110 may apply the hierarchical posterior matching algorithm to select a codeword at either level $l_t^*$ or level $l_t^*+1$ based on which posterior of the corresponding angle-of-arrival set is closer to a threshold value (e.g., ½). Given a snapshot of the posterior at time t, the selection rule is illustrated in FIG. 4. The first device 110 may run the hierarchical posterior matching algorithm for either a fixed length of time or until a certain error probability e for resolution 1/δ is achieved. The final choice of beamforming vector $\hat{w}$ may be determined by the error probability $\epsilon$ and/or the resolution δ. Table 1 below depicts pseudo programming code implementing the hierarchical posterior matching algorithm (Algorithm 1).

$$l_t^* = \underset{l}{\operatorname{argmax}}\left\{\max_k \pi(D_l^k) \geq \frac{1}{2}\right\}, \quad (14)$$

TABLE 1

Algorithm 1: Hierarchical Posterior Matching

1 Input: target resolution $\frac{1}{\delta}$, target error probability $\epsilon$,
  codebook $W^S$ ($S = \log_2 (1/\delta)$), fixed stopping time n,
  stopping-criterion, algorithm-type
2 Output: Estimate of the AoA $\hat{\phi}$
3 Initialization: $\pi_i(0) = \delta$ for all $i = 1, 2, \ldots, 1/\delta$,
4 for $t = 1, 2, \ldots$ do
5   # Codeword selection from $W^S$:
6   k = 0;
7   for $l = 1, 2, \ldots, S$ do
8     if $\pi_{D_l^k}(t) > 1/2$ then
9       # select the larger descendent
10       $l_t^* = l$
11       $k \leftarrow \arg\max_{k' \in \{2k, 2k-1\}} \pi_{D_{l+1}^{k'}}(t);$
12     else $$(l_{t+1}, k_{t+1}) = \underset{(l', k') \in \{(l_t^*, \lceil \frac{k}{2} \rceil), (l_t^*+1, k)\}}{\operatorname{argmin}} \left| \pi_{D_{l'}^{k'}}(t) - \frac{1}{2} \right| \quad (15)$$

break:
14 # Codeword selection result
15   $w_{t+1} = w(D_{l_{t+1}}^{k_{t+1}})$       (16)
16 # Take next measurement
17   $y_{t+1} = \alpha\sqrt{P} w_{t+1}^H a(\phi) + w_{t+1}^H H_{t+1}$       (17)
    $z_{t+1} = q(y_{t+1})$
18 # Posterior update by Bayers' Rule (Sec. III-D)
19   $\pi(t+1) \leftarrow z_{t+1}, \pi(t)$       (18)
20 case: stopping-criterion = fixed length (FL)
21 if $t + 1 = n$ then
22   break (to final beamforming):
23 case: stopping-criterion = variable length (VL)
24 if $\max_i \pi_i(t+1) > 1 - \epsilon$ then
25   break (to final beamforming):
26 # Final beamforming vector design
27 $\tau = t + 1$ (length of the initial access phase)
28 case: algorithm-type = fixed resolution (FR)

29 $$(\hat{l}, \hat{k}) = \left(S, \arg\max_k \pi_{D_S^k}(\tau)\right) \quad (19)$$

30 case: algorithm-type = variable resolution (VR)

31 $$\hat{l} = \begin{cases} 1, & \max_k \pi_{D_1^k}(\tau) < 1 - \epsilon \\ \max\left\{l : \max_k \pi_{D_l^k}(\tau) \geq 1 - \epsilon\right\}, & \text{o.w.} \end{cases} \quad (20)$$

32 $\hat{w} = w(D_j^k)$

The hierarchical posterior matching algorithm may be thought of as a noisy generalization of a bisection search where the posterior is used to create almost equally-probable search subsets subject to the codebook $W^S$. Compared to a conventional bisection technique, the hierarchical posterior matching may remain viable even when the signal-to-noise ratio (SNR) of the communication system is low. The reliability of the outcomes may be dealt with by efficiently coding over the beamforming vectors depending on the posterior. This can be viewed as water-filling in angular domain. Moreover, whereas a conventional noise-compensated bisection method may be viewed as a repetition coding strategy which is known to have a zero rate, the hierarchical posterior matching algorithm may be viewed as a constrained (e.g., subject to hierarchical codebook $W^S$) approximation of the capacity achieving posterior matching feedback coding scheme.

In some example embodiments, the posterior of at least some beam vectors included in the hierarchical beamforming codebook $W^S$ may be subject to updates. For example, allowing $\gamma_h : \pi(t) \rightarrow W^S$ represent the hierarchical posterior matching sequential beamforming design given in Algorithm 1 (e.g., let $w_{t+1} = \gamma_h(\pi(t))$, by the measurement model set forth in Equation (17) of Algorithm 1, the posterior update set forth in Algorithm 1 may be expressed as Equation (21) below.

$$\pi_i(t+1) = \frac{\pi_i(t) f(z_{t+1} \mid \phi = \theta_i, w_{t+1} = \gamma_h(\pi(t)))}{\sum_{j \neq i} \pi_j(t) f(z_{t+1} \mid \phi = \theta_j, w_{t+1} = \gamma_h(\pi(t)))}, \quad (21)$$

wherein $f(z_{t+1} \mid \phi = \theta_i, w_{t+1} = \gamma_h(\pi(t)))$ may be the conditional distribution $z_t$ depending on the function $q(\bullet)$ as well as the channel state information (e.g. the fading coefficient α) known to the first device 110.

For example, in the case of a static fading coefficient α (e.g., zero mobility at the second device 120) such that the first device 110 may be assumed to know the fading coefficient α, with a full measurement $z_t = y_t$, the conditional distribution of $z_t$ may be a complex Gaussian expressed as Equation (22) below.

$$f(z_{t+1} \mid \phi = \theta_i, w_{t+1} = \gamma_h(\pi(t))) = C\mathcal{N}(z_{t+1}; \alpha\sqrt{P} w_{t+1}^H a(\theta_i), \sigma^2) \quad (22)$$

Where the fading coefficient α is not known, the first device 110 may be assumed to use an estimation-based approximation with the estimate $\hat{\alpha}$ for the posterior update as set forth in Equation (23) below.

$$f(z_{t+1} \mid \phi = \theta_i, w_{t+1} = \gamma_h(\pi(t))) \approx C\mathcal{N}(z_{t+1}; \hat{\alpha}\sqrt{P} w_{t+1}^H a(\theta_i), \sigma^2) \quad (23)$$

Alternatively, for practical high speed analog-to-digital converter (ADC) implementations, an extreme quantization function of a 1-bit measurement model $z_t = 1(|y_t|^2 > v_t)$ may be used. Here, at each time instance t, the first device 110 may have 1-bit of information about whether or not the power of the signal received from the second device 110 passes a threshold $v_t$. The measurement model may be expressed as Equation (24) below.

$$z_t = \mathbb{1}(\phi \in D_{l_t}^{k_t}) \oplus u_t(\phi), u_t(\phi) \sim \text{Bern}(p_t(\phi)) \quad (24)$$

wherein $u_t(\phi)$ may denote the equivalent Bernoulli noise with a flipping probability $p_t(\phi)$. The setting of the threshold $v_t$ and the corresponding flipping probability $p_t(\phi)$ is given below in Lemma 1. In this case, the conditional distribution of $z_t$ may be expressed as Equation (25).

$$f(z_{t+1} \mid \phi = \theta_i, w_{t+1} = \gamma_h(\pi(t))) = \text{Bern}(z_{t+1} \oplus 1(\theta_i \in D_{l_t}^{k_t}); p_{t+1}(\theta_i)). \quad (25)$$

The hierarchical posterior matching algorithm may be analyzed with respect to a variable-length stopping time with a fixed resolution δ as well as a fixed target error probability ε, in which case Algorithm 1 can be written as Equation (26) below.

$$\tau_{\varepsilon,\delta} = \min\{t : 1 - \max_i \pi_i(t) \leq \varepsilon\} \quad (26)$$

The analysis may further focus on the 1-bit measurement model described above and assume an ideal hierarchical beamforming codebook. For example, under Assumption 4, the beam formed by the beamforming vector $w(D_l^k) \in W^S$ may have a constant beamforming power gain for any signal having an angle-of-arrival $\phi \in D_l^k$. Any signal outside of $D_l^k$ may be rejected. Assumption 4 may be expressed as Equation (27) below.

$$|w(D_l^k)^H a(\phi)| = \begin{cases} G_l, & \text{if } \phi \in D_l^k \\ 0, & \text{if } \phi \notin D_l^k \end{cases} \quad (27)$$

It should be appreciated that Assumption 4 may be approximately true give a large quantity of antennas $$N \gg \frac{1}{\delta}.$$

The deterioration of performance due to the imperfect beamforming, such as that resulting from sidelobe leakage, is not the focus of this analysis. This assumption may also be removed in numerical simulations by investigating the performance of various algorithms under the actual beamforming pattern with finite number of antennas.

Under a 1-bit measurement model $z_t = 1(|y_t|^2 > v_t)$ with Assumption 4 and an optimal choice for the threshold $v_t$ in Lemma 1, the flipping probability $v_t(\phi)$ of the Bernoulli noise in Equation (24) may be independent of the angle-of-arrival $\phi$ and dependent only upon the beamforming codeword level $l_t$ selected at time t. This is illustrated in Equation (28) below.

$$p_t(\phi) = p[l_t] := \int_0^{v_t} \text{Rice}(x; PG_l^2, \sigma^2) dx \quad (28)$$

wherein $p[l] > p[l+1]$ and $p[l] \to 0$ since $G_l < G_{l+1}$ and $G_l \to \infty$ as $l \to \infty$ (assuming an unlimited number of antenna) by the design of the beamforming codebook. Moreover, the value of $\log_2(1/\delta)$ may be assumed to be an integer. Accordingly, the expected stopping time $t_{\varepsilon,\delta}$ of the hierarchical posterior matching algorithm with a resolution $$\frac{1}{\delta}$$

and an outage probability ε may be associated with an upper bound.

Notably, according to Theorem 1, by using the beamforming codebook $W^S$ with $S = \log_2(1/\delta)$ levels and applying an assumption of perfect beamforming (Assumption 4) as well as the 1-bit measurement model $z_t = 1(|y_t|^2 > v_t)$ with the optimal choice of threshold $v_t$ in Lemma 1, an upper bound b of the expected stopping time with a resolution $$\frac{1}{\delta}$$

and error probability ε may be calculated based on Equation (29).

$$\mathbb{E}[\tau_{\varepsilon,\delta}] \leq \frac{\log(1/\delta)}{R_h} + \frac{\log(1/\varepsilon)}{E_h} + o\left(\log\left(\frac{1}{\delta_\varepsilon}\right)\right), \text{ wherein} \quad (29)$$

$$E_h = C_1(p(\log_2(1/\delta))),$$

$$R_h = I(1/3; p[l']) \text{ with } l' = \left\lfloor \frac{K_0\left[\log\log\frac{1}{\delta}\right]}{\log 2} - 1 \right\rfloor \text{ and } K_0$$

is a constant defined in Lemma 4 below.

As a first corollary (Corollary 1), letting $\mathbb{E}[\tau_{\epsilon,\delta}]=n$, for all values of $\delta$ such that $\delta \leq 2^{nR_h}$ the error probability $\epsilon$ of the hierarchical posterior matching algorithm may have an approximate upper bound expressed by Equation (30) below, when $\delta$ is a sufficiently small value.

$$\mathbb{P}(|\tilde{\phi} - \phi| > \delta) \underset{\approx}{<} \exp\left(-nE_h\left(1 - \frac{\log(1/\delta)}{nR_h}\right)\right) \quad (30)$$

For a second corollary (Corollary 2), under the same conditions and by Theorem 1, the acquisition rate that can be achieved by applying the hierarchical posterior matching algorithm may be expressed by Equation (31) below.

$$\lim_{\delta \to 0} \frac{\log(1/\delta)}{\mathbb{E}[\tau_{\epsilon,\delta}]} \geq \lim_{\delta \to 0} R_h = \lim_{\delta \to 0} I(1/3; p^*(\delta, \epsilon)) = 1 \quad (31)$$

For arbitrarily small error $\epsilon > 0$, and error exponent $$\lim_{\epsilon \to 0} \frac{\log(1/\epsilon)}{\mathbb{E}[\tau_{\epsilon,\delta}]} \geq \lim_{\epsilon \to 0} E_h = C_1(p[\log_2(1/\delta)]) \quad (32)$$

For any $\delta > 0$.

It should be appreciated that the integer assumption of $\log_2(1/\delta)$ may simplify notation. However, if the desired resolution $1/\delta$ is not of a power of 2, a higher resolution $$\frac{1'}{\delta} = 2^{\lceil \log_2((1/\delta)) \rceil}$$

may be taken. The corresponding upper bound in Theorem 1 may be written accordingly and the conclusion of Corollary 2 remains true.

The acquisition rate of one in Equation (31) may imply that the hierarchical posterior matching algorithm performs asymptotically ($\delta \to 0$) in the same manner as a noiseless bisection search, which may be the optimal usage of the hierarchical beamforming codebook $W^S$. The asymptotically noiseless behavior may be due to the fact that algorithm shrinks the angle-of-arrival $D_l^k$ quickly, together with Assumption 4 that an unlimited quantity of antennas allow the beamforming gain $$|w(D_l^k)^H a(\phi)|^2 = \frac{\pi}{|D_l^k|} \to \infty \text{ as } l \to \infty.$$

Compared with other beam alignment algorithms, non-adaptive random coding based strategies may be incapable of shrinking the angle-of-arrival region of the search beam. Therefore, the corresponding acquisition rate of rate may be strictly lesser than one. On the other hand, the adaptive noisy conventional bisection algorithm has a rate of zero, albeit the angle-of-arrival region of the search beam shrinks over time. This may be due to the fact that the noisy bisection strategy in effect employs repetition coding, which has rate zero even with feedback (e.g., adaptivity).

Figure 5A:
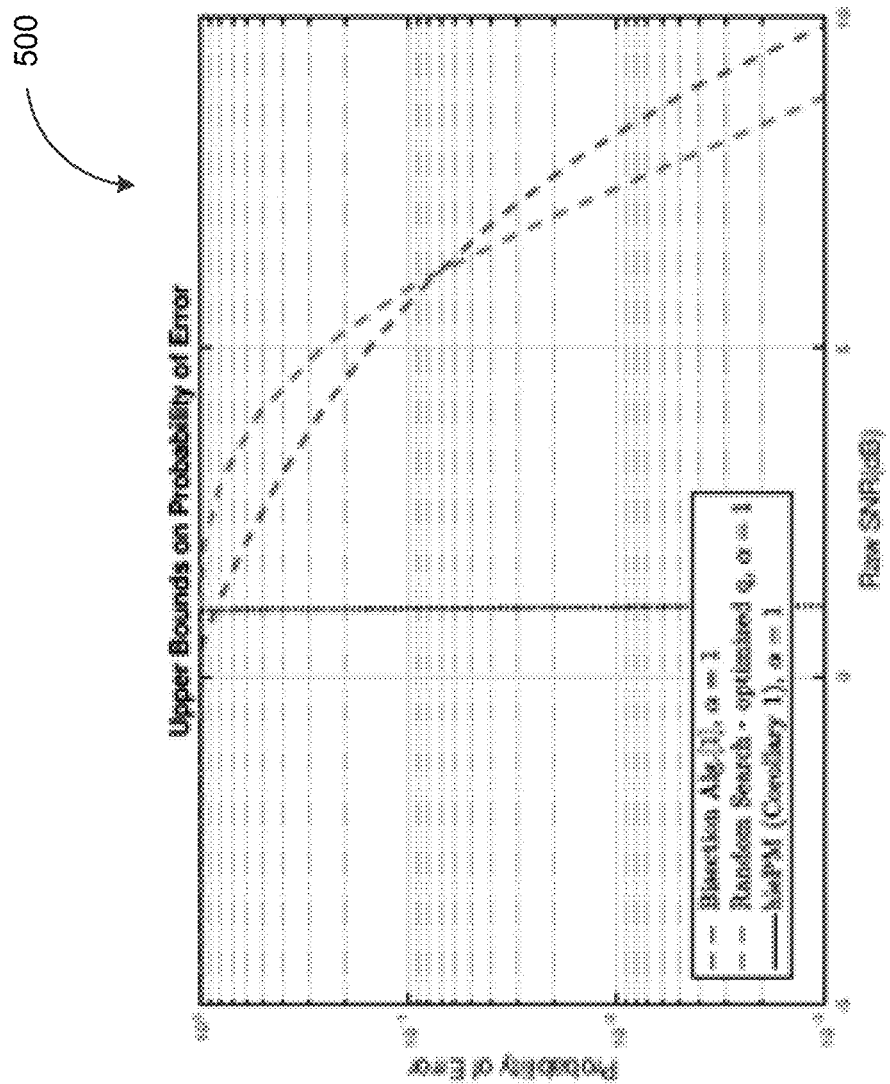
FIG. 5A depicts a graph illustrating a comparison of the theoretical upper bounds on error probability between a hierarchical posterior matching algorithm, a random coding algorithm, and a bisection algorithm as a function of raw signal-to-noise ratio (SNR), in accordance with some example embodiments.

To further compare the results of the hierarchical posterior matching algorithm with other beam alignment algorithms, FIG. 5A depicts a graph 500 in which Corollary 2 is plotted together with the upper bounds for the error probability $\in$, $\mathbb{E}[\tau]=28$, $1/\delta=128$, and $\Theta=120°$ as well as the ideal beamforming assumption (Assumption 4). For example, graph 500 may illustrate a comparison of the theoretical upper bounds on error probability $\epsilon$ between the hierarchical posterior matching algorithm, the random coding algorithm, and the bisection algorithm as a function of raw signal-to-noise ratio (SNR) $P/\sigma^2$. The upper bound on the hierarchical posterior matching algorithm may be given by Corollary 1.

For the bisection algorithm, the upper bound may be derived from an analysis for equal power allocation with a fixed fading coefficient $\alpha=1$. For random hashing, an optimization of the number of directions over Gallager's random coding bound of a binary symmetric channel (BSC) may be expressed as Equations (33)-(35) below.

$$P_e \leq \min_q \exp(-28 \times E_{RC}(q)), \text{ wherein} \quad (33)$$

$$E_{RC}(q) = \max_{0 \leq \rho \leq 1}\left(E_0(\rho, q) - \rho \times \frac{\log_2 128}{28}\right) \text{ and}$$

$$E_0(\rho, q) = -\log\left(\left(q(p_q)^{\frac{1}{1+\rho}} + (1-q)(1-p_q)^{\frac{1}{1+\rho}}\right)^{1+\rho} + \left(q(1-p_q)^{\frac{1}{1+\rho}} + (1-q)(p_q)^{\frac{1}{1+\rho}}\right)^{1+\rho} \text{ with} \quad (34)$$

$$p(q) := \int_0^{v_t} Rice\left(x; P\frac{3}{2q}, \sigma^2\right)dx, \quad (35)$$

wherein the threshold $v_t$ may optimally chosen according to Lemma 1. The illustration of Corollary 2 in FIG. 5A indicates the superior performance of the hierarchical posterior matching algorithm over other beamforming techniques such as random hashing and bisection. It should be appreciated that for these upper bounds, the hierarchical posterior matching algorithm and the random hashing technique may assume a 1-bit quantizer whereas the bisection method is provided unquantized amplitude information. In fact, the numerical simulation described below shows that with practical beam patterns and unquantized measurements, the actual performance of the hierarchical posterior matching algorithm provides superior performance over existing techniques and in fact achieves a significantly smaller error probability than the theoretical upper bound.

The performance of the hierarchical posterior matching algorithm relative to other techniques, such as random hashing and bisection, may also be analyzed based on numerical results. For example, a simulation may be performed in the communication system 100, which may have a hybrid analog/digital system architecture in which the first device 110 includes N=64 antennas and the second device 120 includes a single (virtual) antenna. Furthermore, the simulation considers a normalized channel model with a single link between the first device 110 and the second device 120, where the channel may be a single path with a fading coefficient $\alpha$. The simulation may contemplate one scenario in which the fading coefficient $\alpha$ is known (e.g., as exactly $\hat{\alpha}=\alpha$) as well as the scenario in which the fading coefficient $\alpha$ is estimated with an estimation inaccuracy modeled as $\hat{\alpha} \sim \mathcal{CN}(\alpha, \sigma_\alpha^2)$. The angle-of-arrival may be learned with an angular resolution of $1/\delta=128$ and an (expected) stopping time of $\mathbb{E}[\tau]=28$ (e.g., with $\mathbb{E}[\tau]$ selections of beamforming vectors or samples).

Figure 5B:
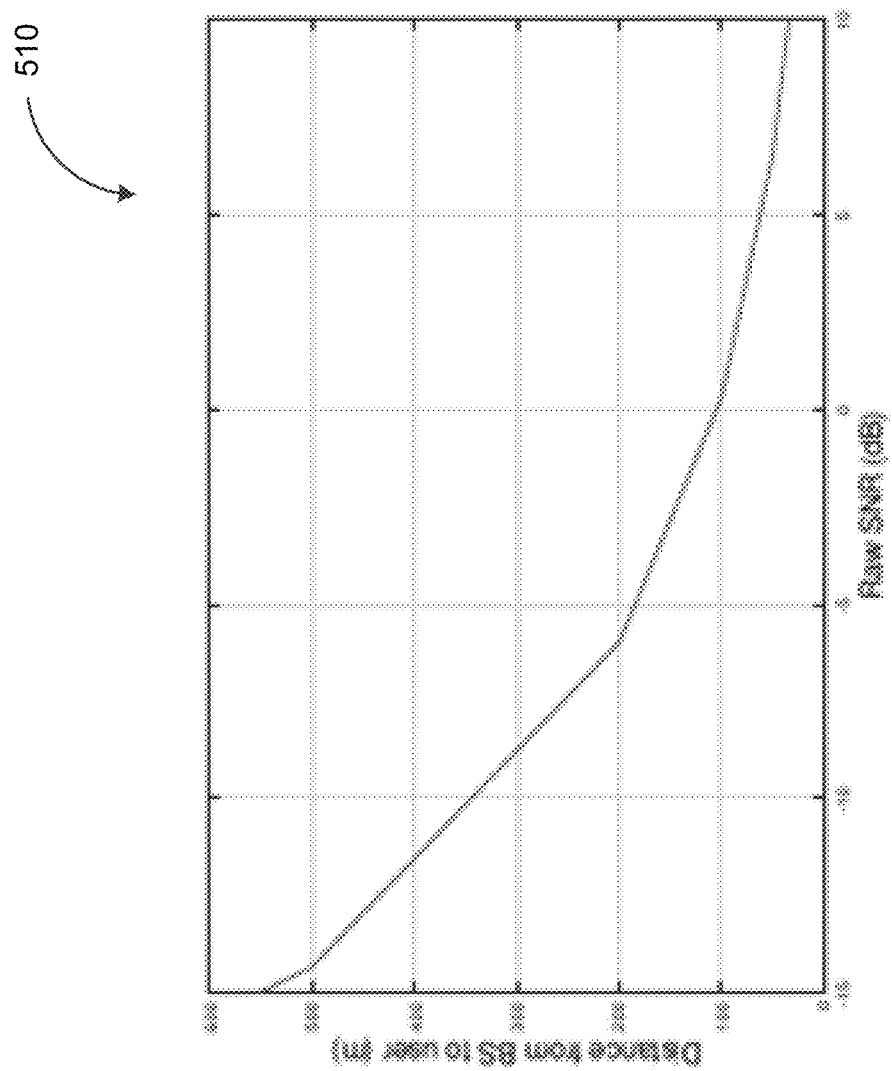
FIG. 5B depicts a graph illustrating a relationship between raw signal-to-noise ration and distance from a first device to a second device, in accordance with some example embodiments.

To provide a sense for the above normalized parameters, some candidate physical (PHY) layer solutions may be considered. In particular, when using a 5G new radio Physical Random Access Channel (PRACH) format B4, the $E[\tau]=28$ quantity of samples may translate to less than 2-millisecond acquisition time for sub-1-degree angular resolution within a [0°, 120°] sector. Furthermore, if the 3GPP TR 38.901 UMi LOS pathloss channel model is adopted, with a 23 decibel per milliwatt (dBm) power at the second device 120, −174 dBm/Hz thermal noise density, a 5 decibel receiver noise figure at the first device, with a bandwidth of 100 MHz, the expected distance at which a target raw signal-to-noise ratio is obtained is depicted in the graph 510 shown in FIG. 5B. Graph 510 illustrates the relationship between raw signal-to-noise ratio $P/\sigma^2$ and the distance from the first device 110 to the second device 120, under the 3GPP TR 38.901 UMi LOS pathloss channel model, with 73 gigahertz carrier frequency, 23 decibel maximum power at the second device 120, −174 dBm/Hz thermal noise density, 5 decibel receiver noise figure at first device 110, and a bandwidth of 100 megahertz. That is, given the foregoing selection of physical (PHY) layer and parameters, the practical raw signal-to-noise ratio regime of interest may be within −15 decibels to 10 decibels.

In some example embodiments, the hierarchical posterior matching algorithm may be based on sequential beam refinement, but may implement additional coding techniques. As such, the analysis may focus on comparison to a bisection refinement in order to highlight the use of this coding strategy differentiates the hierarchical posterior matching algorithm from existing beam refinement strategies.

For the hierarchical posterior matching algorithm as well as the bisection algorithm, the finite set of beamforming vectors $W^S$ may be designed with a hierarchical structure shown, for example, in FIGS. 3-4. The total quantity of levels may be $S=\log_2 1/\delta=7$. Correspondingly, for the bisection algorithm, the quantity of beamforming vectors in each level may be $K=2$, and the power may be allocated according to an equal power distribution strategy.

To represent non-adaptive algorithms that are a variation of random coding, such as a random hashing algorithm, the hierarchical posterior matching algorithm may be compared to the random search algorithm that randomly scans various regions of interest. The random search algorithm may uses a beamforming codebook $$\mathcal{W}_n^q \text{ of size} |\mathcal{W}_n^q| = \binom{n}{q} = (n),$$

which may include all possible beam patterns with a total width $$\frac{q}{n}|\Theta_2 - \Theta_1|,$$

where the region of interest $|\Theta_2-\Theta_1|$ may be divided into n non-overlapping directions, and q directions may be probed in each beam pattern. At any time instant t, the random search algorithm may randomly select a beamforming vector $w_{t+1}$ from the pre-designed codebook $\mathcal{W}_n^q$. A fixed number of measurements $\tau$ may be taken according to Equation (17) and the final beamforming vector may be selected according to Equations (18) and (19). The discretization parameter may be set to $n=1/\delta=128$, with $\tau=28$, various values of q may be plotted.

Figure 5C:
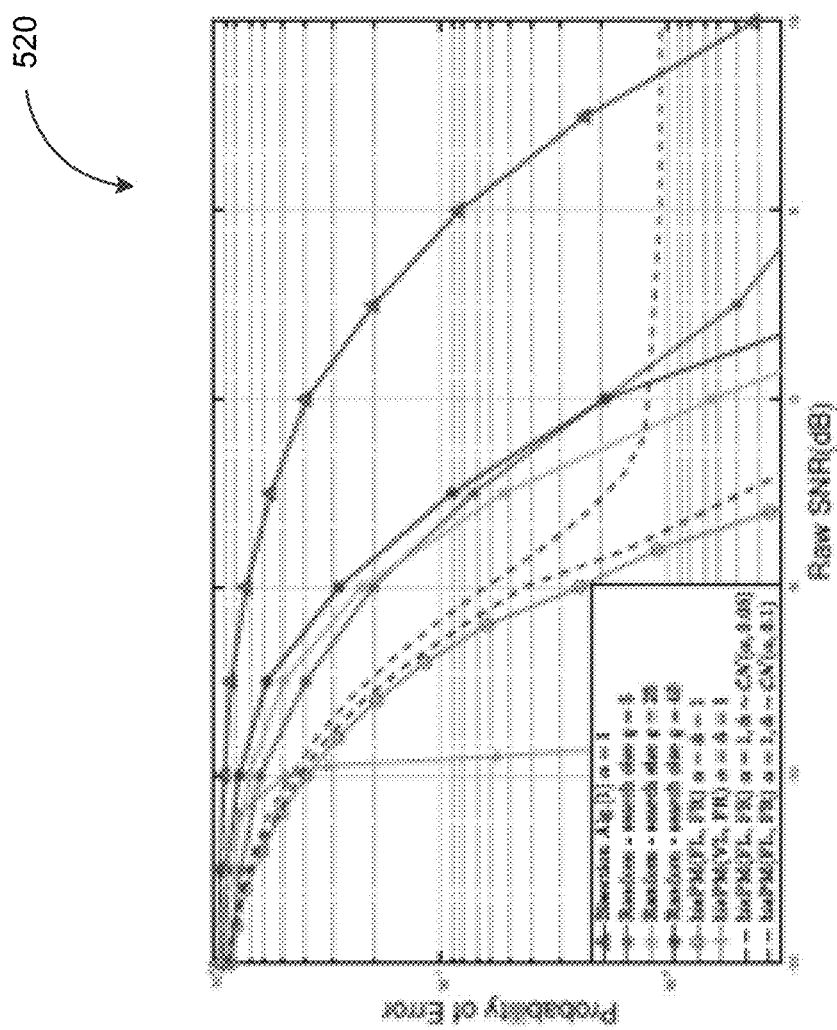
FIG. 5C depicts a graph illustrating a comparison of the error probability between a hierarchical posterior matching algorithm, a random search algorithm, and a bisection algorithm as a function of raw signal-to-noise (SNR) ratio, in accordance with some example embodiments.

FIG. 5C depicts a graph 520 in which error probability is plotted as a function of raw signal-to-noise ratio (SNR). For example, the graph 520 may depict a comparison of the error probability $\in$ of the hierarchical posterior matching algorithm, the random search algorithm, and the bisection algorithm as a function of raw signal-to-noise (SNR) ratio $P/\sigma2$. Here, initial access length $\tau=28$, achieved under 2 milliseconds using the 5G NR PRACH format B4 (e.g., $E[\tau]=28$ for variable-length stopping type), may be used for acquiring the angle-of-arrival (AoA) with a resolution of $1/\delta=128$.

As shown in FIG. 5C, with either a fixed-length stopping time and a variable-length stopping time, the hierarchical posterior matching algorithm outperforms the bisection algorithm as well as a random code based strategy (e.g., the best case performance of random-hash based solutions). It should be appreciated that random beamforming codebooks may also outperform the bisection algorithm. Adaptivity gain may also be characterized by optimizing the coding rate q and comparing against the hierarchical posterior matching algorithm. In fact, the hierarchical posterior matching algorithm significantly outperforms the analytical upper bound.

For the system and channel described above, a simulation scenario may be conducted where the average error probability $\epsilon$ as a function of raw signal-to-noise ratio (SNR) is analyzed. The error probability $\epsilon$ of the angle-of-arrival estimation may be taken to be the probability of selecting an erroneous final beamforming vector $\text{Prob}\{\hat{w}(z_{1:\tau}, w_{1:\tau}, \epsilon, \delta) \neq w(\phi)\}$.

For clarity, the naming convention hiePM(stopping-criterion, resolution-criterion) may be used to specify the case selections of stopping criteria and resolution-criteria in the proposed hierarchical posterior matching (hiePM) algorithm (Algorithm 1). As shown in FIG. 5C, hiePM(FL, FR) may exhibit superior performance with a fixed and known fading coefficient $\alpha=1$ when compared to the bisection algorithm as well as the random search algorithm. Under reasonable tuning of parameter q, it is evident that even a non-adaptive random search algorithm may achieve better performance than an adaptive bisection algorithm. As noted, the best performance may be achieved by the hierarchical posterior matching algorithm due to its sequential coding strategy whereas the performance of the bisection algorithm may suffer due to its resemblance to a repetition code.

Improvements in the probability of error e is observed by hiePM(VL, FR) with targeted error probability $\epsilon$ selected such that $E[\tau]=28$. The benefit of allowing a variable stopping time is evident in that it causes a sharp drop in the error probability $\epsilon$ at approximately −10 decibels of raw signal-to-noise ratio. The error probability upper bound (Corollary 1) on hiePM(VL, FR) is also plotted in the graph 520 of FIG. 5C. As shown, this upper bound may predict the sharp slope of hiePM(VL, FR), theoretically guaranteeing a significant performance improvement in error probability $\epsilon$ for hiePM (VL, FR) over the bisection algorithm as well as the random search algorithm for a large signal-to-noise ratio (SNR).

The bisection algorithm may learn the angle-of-arrival without any knowledge of the channel. It combines the procedures of angle-of-arrival estimation and channel estimation. Contrastingly, the hierarchical posterior matching algorithm may require knowledge of the fading coefficient $\alpha$ in the posterior update portion of Algorithm 1 (e.g., Equation (18)). While a channel estimation procedure may be used to learn the fading coefficient $\alpha$ beforehand, such as in a short preliminary phase, the analysis relies on the performance achieved using an estimate for the fading coefficient $\hat{\alpha}$ instead. Here, the improved performance of the hierarchical posterior matching algorithm over the bisection algorithm of

[1] and the random search algorithm holds even without full knowledge of the fading coefficient α. To see this, consider the case of a mismatched update rule (e.g., Equation (18)) with an estimate for the fading coefficient $\hat{\alpha} = \mathcal{E} \mathcal{N}(\alpha, \sigma_\alpha^2)$. We see that even under a reasonably mismatched estimate of the fading coefficient (e.g., $\sigma_\alpha^2 = 0.05$), all strategies based on the hierarchical posterior matching algorithm still achieved a lower probability of error ε than the bisection algorithm. In other words, the degradation due to an error in the estimation of the fading coefficient may be less significant, saturating in error probability ε only at very a large signal-to-noise ratio (SNR) (e.g., >5 decibels).

Practically speaking, a more efficient angle-of-arrival learning algorithm may reduce communication over-head as well as increase the accuracy of the final beamforming vector. To observe these effects, the overall performance of a communication link established by the hierarchical posterior matching algorithm may be evaluated in terms of the data transmission rate. The data transmission rate may be evaluated according to Equation (8) above, using the final beamforming vector $\hat{w}(z_{1:\tau}, w_{1:\tau}, \epsilon, \delta)$ yielded by each algorithm. Due to its dependence on the on the final beamforming vector $\hat{w}$, the data transmission rate may encompass the design parameters ε and δ, which have been the focus of the analysis, while still providing an intuitive practical measure. The total communication time frame may be set to $T=100 \mathbb{E}[\tau]$.

Figure 5D:
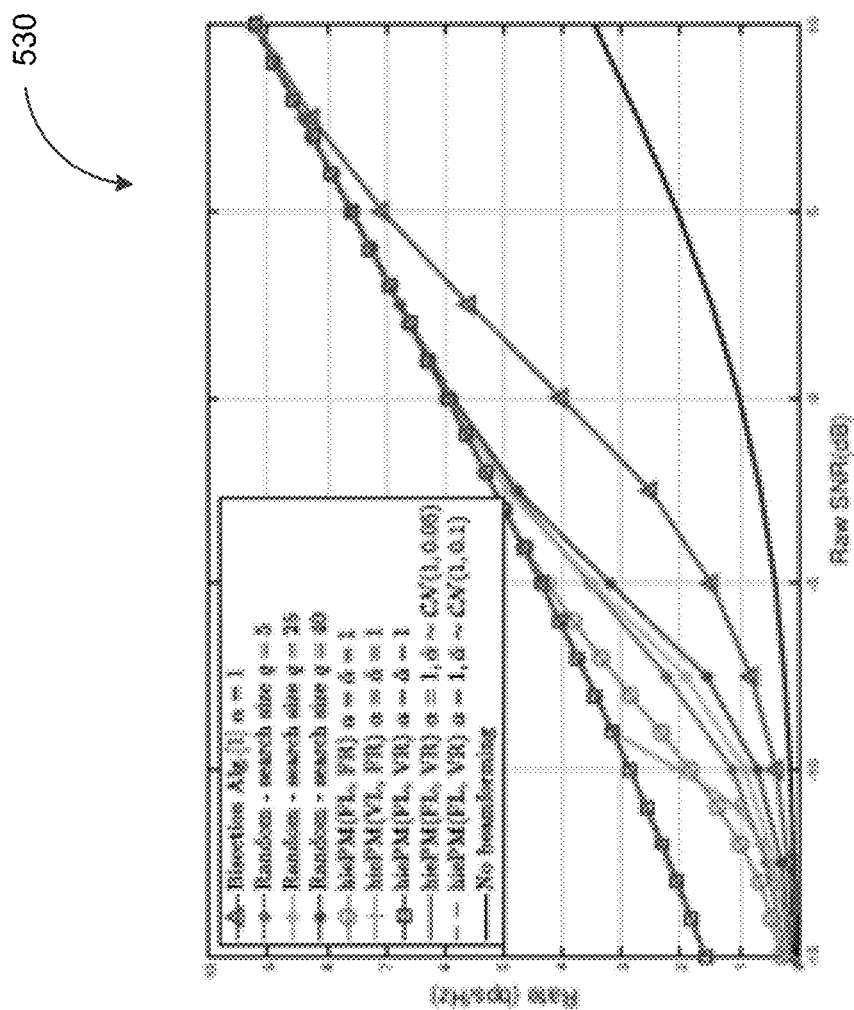
FIG. 5D depicts a graph illustrating a comparison of the data transmission rates obtained by a hierarchical posterior matching algorithm, a random search algorithm, and a bisection algorithm as a function of raw signal-to-noise (SNR) ratio, in accordance with some example embodiments.

FIG. 5D depicts a graph 530 illustrating the gain in data transmission rate obtained by various implementations of the hierarchical posterior matching algorithm relative to the bisection algorithm and the random search algorithm for the system and channel described above as a function of raw signal-to-noise ratio (SNR). The graph 530 may depict a comparison of the data transmission rates obtained by the hierarchical posterior matching algorithm, the random search algorithm, and the bisection algorithm as a function of raw signal-to-noise ratio (SNR) P/σ2. An initial access time τ=28 may be achieved under 2 milliseconds using the 5G NR PRACH format B4 (e.g., E[τ]=28 for variable-length stopping). The data transmission rate may be given by Equation (8) above with the final beamforming vector $\hat{w}$ designed by the each algorithm.

The data transmission rate in the absence of any beam alignment is depicted in graph 530 to provide a reference point. FIG. 5D shows that all variants of the hierarchical posterior matching algorithm outperform the bisection algorithm significantly in the signal-to-noise ratio regime of (−5 dB to 5 dB). On the other hand, the performance of the bisection algorithm may approach that hierarchical posterior matching as the signal-to-noise ratio exceeds 7 decibels. FIG. 5D also shows the benefits of opportunistically selecting the resolution of the final beam, as is done under hiePM(FL, VR) according to Equation (20). This feature may be particularly important in very low signal-to-noise ratio (SNR) models (e.g., −15 dB to −7 dB) where hiePM (FL, VR) adapts the final beamforming vector to the final posterior distribution at time τ, hence setting the angular resolution of the communication beam in an opportunistic manner. Even more importantly, this significant performance improvement is robust to channel estimation error and mismatched estimate of the fading coefficient $\hat{\alpha}$. This phenomenon may be observed in FIG. 5C, where the error probability ε of finding the correct beam with resolution 1/δ, when a signal-to-noise ratio (SNR) less than −5 decibels, may be non-negligible under hiePM(FL, FR) and hiePM (VL, FR).

Figure 6:
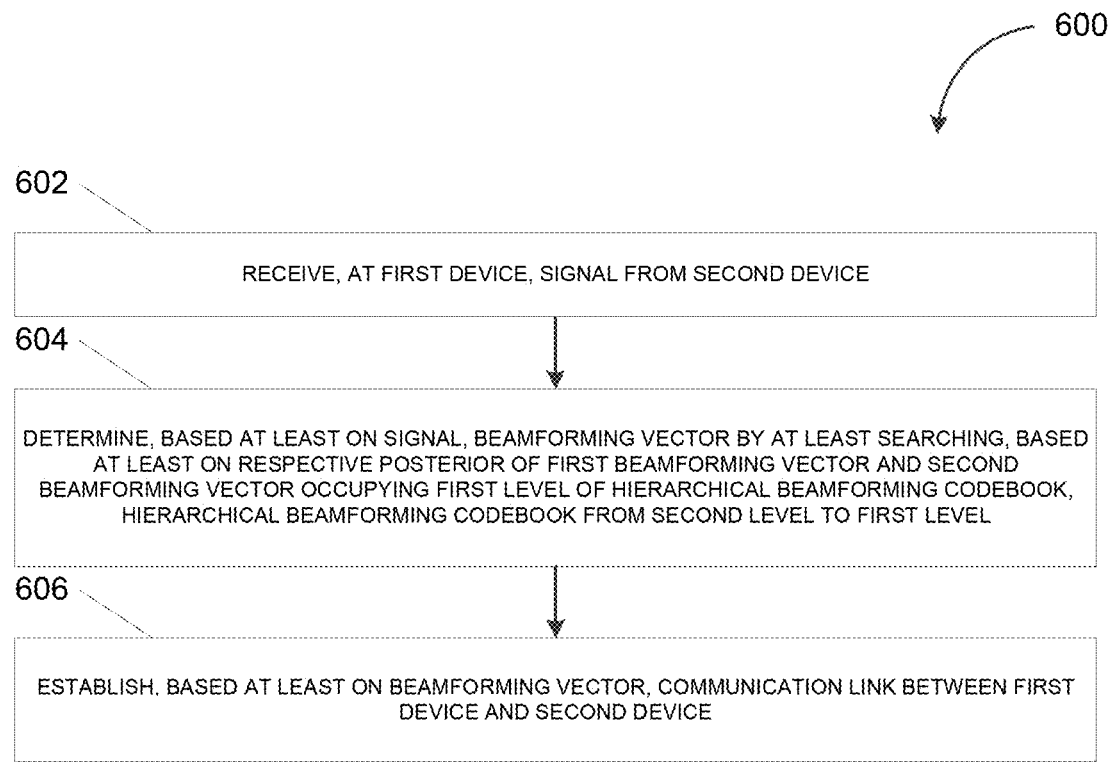
FIG. 6 depicts a flowchart illustrating an example of a process for beam alignment, in accordance with some example embodiments.

FIG. 6 depicts a flowchart illustrating an example of a process 600 for beam alignment, in accordance with some example embodiments. Referring to FIGS. 1 and 6, the process 600 may be performed at the first device 110 which, in the example of the communication system 100 shown in FIG. 1, may be a base station serving mobile devices, such as the second device 120, in the angular range [Θ1, Θ2] (e.g., from 30° to 160°). The communication link between the first device 110 and the second device 120 may be in a high frequency band such as, for example, the 3 gigahertz to 100 gigahertz band associated with microwaves and millimeter waves, the 0.1 terahertz to 30 terahertz band, and/or the like. Beamforming may therefore be applied to increase the robustness of the high frequency communication link because the shorter wavelength signals (e.g., millimeter waves, sub-millimeter waves, and/or the like) are more susceptible to attenuation and interference.

At 602, the first device 110 may receive, from the second device 120, a signal. In some example embodiments, the first device 110 and the second device 120 may each include an array of multiple antennas that is coupled with a single radio frequency (RF) chain. A robust communication link between the first device 110 and the second device 120 may require the first device 110 and the second deice 120 to perform a beam alignment, such that the first device 110 and the second device 120 are able to exchange highly directional beams that increase the signal-to-noise ratio (SNR) of the high frequency communication link and decrease the frequency of link outage. To achieve a highly directional beam from the first device 110 to the second device 120, the first device 110 may require a precise and reliable estimate of a channel state information (CSI) during an initial access phase. For example, during an initial access phase, the first device 110 may determine an angle-of-arrival (AoA) of a signal (e.g., a pilot signal and/or the like) sent from the second device 120 to the first device 110.

At 604, the first device 110 may determine, based at least on the signal, a beamforming vector by at least searching, based at least on a respective posterior of a first beamforming vector and a second beamforming vector occupying a first level of a hierarchical beamforming codebook, the hierarchical beamforming codebook from a second level of the hierarchical beamforming codebook to the first level of the hierarchical beamforming codebook. In some example embodiments, the first device 110 may actively learn the angle-of-arrival φ of the signal from the second device 120 by determining, based at least on a sequential collection of the observations $y_t$, one or more beams $w_t \in W^S$ for estimating the angle-of-arrival φ. For example, the first device 110 may perform a search of the hierarchical beamforming codebook 300 in which a set of beam patterns are organized into successive levels of increasing angular resolution. As shown in FIG. 3, the first level 310 of the hierarchical beamforming codebook 300 may include the first beam pattern 315 that is a union of the second beam pattern 325a and the third beam pattern 325b occupying the second level 320 of the hierarchical beamforming codebook 300. The search of the hierarchical beamforming codebook 300 may be performed based on a posterior probability of the optimal beam pattern being within an angular range of the beam patterns occupying each level of the hierarchical beamforming codebook. For instance, the search from the first level 310 to the second level 320 of the hierarchical beamforming codebook may be informed based at least on a respective posterior probability of the optimal beam pattern being within an angular range of the second beam pattern 325a and an angular range of the third beam pattern 325b. The first device 110 may further update these posterior probabilities based on subsequent measurements of the quality of the signal that is measured with the second beam pattern 325a and/or the third beam pattern 325b.

At 606, the first device 110 may establish, based at least on the beamforming vector, a communication link between the first device 110 and the second device 120. For example, by searching the hierarchical beamforming codebook based on the posteriors of the beamforming vectors included in the hierarchical beamforming codebook, the first device 110 may identify the beamforming vector $w_t \in \mathbb{C}^N$ capable of achieving a threshold quality communication link between the first device 110 and the second device 120. The first device 110 may apply the beamforming vector $w_t \in \mathbb{C}^N$ to reconstruct the signal from the second device 120 by at least combining, based on the beamforming vector $w_t \in \mathbb{C}^N$, the signal that is received at each of the N quantity of antenna elements at the first device 110. Beamforming in this manner may achieve a power gain that compensates for the high pathloss associated with the high frequency communication link between the first device 110 and the second device 120.

Figure 7:
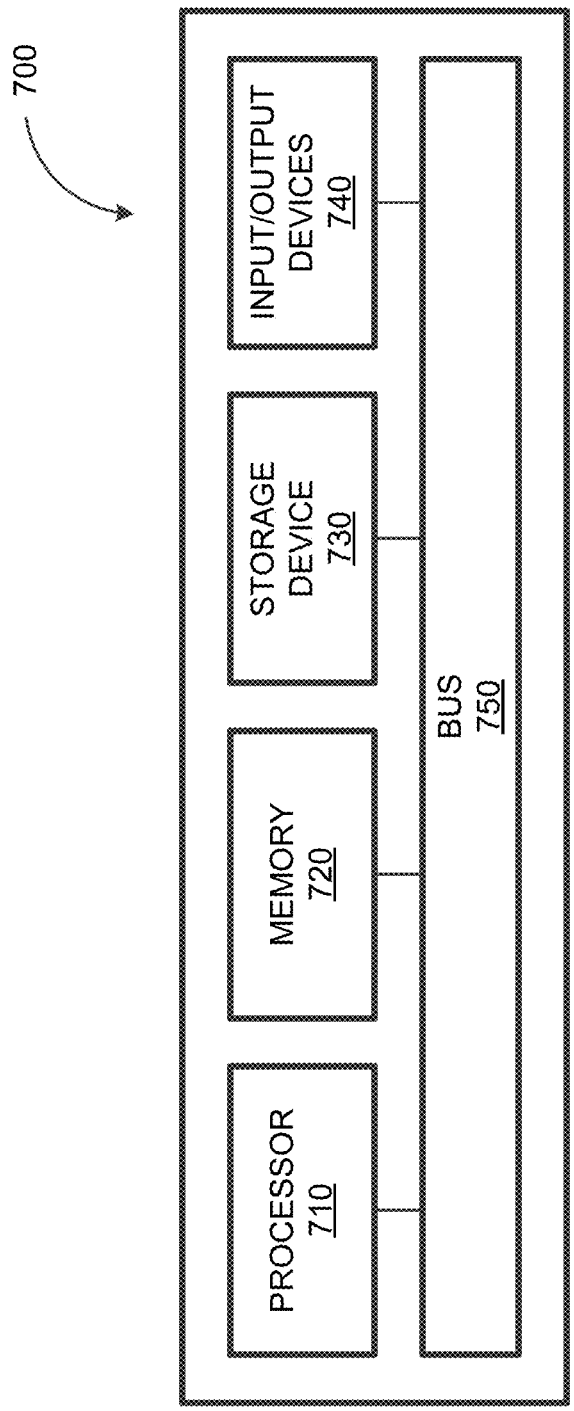
FIG. 7 depicts a block diagram illustrating a computing system, in accordance with some example embodiments.

FIG. 7 depicts a block diagram illustrating a computing system 700, in accordance with some example embodiments. Referring to FIGS. 1 and 7, the computing system 700 may implement, for example, the first device 110, the second device 120, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the first device 110, the second device 120, and/or the like. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
      determining a beamforming vector for a communication link between a first device and a second device, the determining includes searching, based at least on a signal from the second device, a hierarchical beamforming codebook including a plurality of beamforming vectors occupying a plurality of levels, each level of the plurality of levels being occupied by beamforming vectors having a higher angular resolution than beamforming vectors in a preceding level, the plurality of beamforming vectors including a first beamforming vector having a first angular range occupying a first level of the hierarchical beamforming codebook, the plurality of beamforming vectors further including a second beamforming vector and a second angular range occupying a second level of the hierarchical beamforming codebook, the searching of the hierarchical beamforming codebook includes searching from the first level of the hierarchical beamforming codebook to the second level of the hierarchical beamforming codebook by at least selecting, based at least on a first posterior probability an angle-of-arrival of the signal from the second device being in the first angular range, the first beamforming vector before selecting, based at least on a second posterior probability of the angle-of-arrival of the signal from the second device being in the second angular range, the second beamforming vector as the beamforming vector; and
      establishing, based at least on the beamforming vector, the communication link between the first device and the second device.

2. The system of claim 1, wherein the plurality of beamforming vectors further includes a third beamforming vector occupying the second level of the hierarchical beamforming codebook, and wherein the first angular range of the first beamforming vector is a union of the second angular range of the second beamforming vector and a third angular range of the third beamforming vector.

3. The system of claim 2, further comprising:
   updating, based at least on a quality of the signal received at the first device with the second beamforming vector, the second posterior probability associated with the second beamforming vector and/or a third posterior probability associated with the third beamforming vector.

4. The system of claim 3, wherein the second beamforming vector is selected instead of the third beamforming vector based at least on the second posterior probability associated with the second beamforming vector being closer to a threshold value than third posterior probability associated with the third beamforming vector.

5. The system of claim 1, wherein the second beamforming vector is selected as the beamforming vector for the communication link upon reaching a threshold quantity of frames during which the second device transmits the signal.

6. The system of claim 1, wherein the second beamforming vector is selected as the beamforming vector based at least on a quality of the signal associated with the second beamforming vector exceeding a threshold value.

7. The system of claim 1, wherein the first device and the second device each include a plurality of antennas coupled with a radio frequency (RF) chain, and wherein the beamforming vector is applied to combine a plurality of signals received at the plurality of antennas.

8. The system of claim 1, wherein the communication link operates in a 3 gigahertz to 100 gigahertz band and/or a 0.1 terahertz to 30 terahertz band, and wherein the signal comprises microwaves, millimeter waves, and/or sub-millimeter waves.

9. The system of claim 1, wherein the beamforming vector is determined during an initial access phase.

10. The system of claim 1, wherein the first device comprises a base station and the second device comprises a mobile device.

11. A computer-implemented method, comprising:
    determining a beamforming vector for a communication link between a first device and a second device, the determining includes searching, based at least on a signal from the second device, a hierarchical beamforming codebook including a plurality of beamforming vectors occupying a plurality of levels, each level of the plurality of levels being occupied by beamforming vectors having a higher angular resolution than beamforming vectors in a preceding level, the plurality of beamforming vectors including a first beamforming vector having a first angular range occupying a first level of the hierarchical beamforming codebook, the plurality of beamforming vectors further including a second beamforming vector and a second angular range occupying a second level of the hierarchical beamforming codebook, the searching of the hierarchical beamforming codebook includes searching from the first level of the hierarchical beamforming codebook to the second level of the hierarchical beamforming codebook by at least selecting, based at least on a first posterior probability an angle-of-arrival of the signal from the second device being in the first angular range, the first beamforming vector before selecting, based at least on a second posterior probability of the angle-of-arrival of the signal from the second device being in the second angular range, the second beamforming vector as the beamforming vector; and establishing, based at least on the beamforming vector, the communication link between the first device and the second device.

12. The method of claim 11, wherein the plurality of beamforming vectors further includes a third beamforming vector occupying the second level of the hierarchical beamforming codebook, and wherein the first angular range of the first beamforming vector is a union of the second angular range of the second beamforming vector and a third angular range of the third beamforming vector.

13. The method of claim 12, further comprising:
updating, based at least on a quality of the signal received at the first device with the second beamforming vector, the second posterior probability associated with the second beamforming vector and/or a third posterior probability associated with the third beamforming vector.

14. The method of claim 13, wherein the second beamforming vector is selected instead of the third beamforming vector based at least on the second posterior probability associated with the second beamforming vector being closer to a threshold value than a third posterior probability associated with the third beamforming vector.

15. The method of claim 11, wherein the second beamforming vector is selected as the beamforming vector for the communication link upon reaching a threshold quantity of frames during which the second device transmits the signal.

16. The method of claim 11, wherein the second beamforming vector is selected as the beamforming vector based at least on a quality of the signal associated with the second beamforming vector exceeding a threshold value.

17. The method of claim 11, wherein the first device and the second device each include a plurality of antennas coupled with a radio frequency (RF) chain, and wherein the beamforming vector is applied to combine a plurality of signals received at the plurality of antennas.

18. The method of claim 11, wherein the communication link operates in a 3 gigahertz to 100 gigahertz band and/or a 0.1 terahertz to 30 terahertz band, and wherein the signal comprises microwaves, millimeter waves, and/or sub-millimeter waves.

19. The method of claim 11, wherein the beamforming vector is determined during an initial access phase.

20. A non-transitory computer readable medium storing instructions, which when executed by at least one data processor, result in operations comprising:

determining a beamforming vector for a communication link between a first device and a second device, the determining includes searching, based at least on a signal from the second device, a hierarchical beamforming codebook including a plurality of beamforming vectors occupying a plurality of levels, each level of the plurality of levels being occupied by beamforming vectors having a higher angular resolution than beamforming vectors in a preceding level, the plurality of beamforming vectors including a first beamforming vector having a first angular range occupying a first level of the hierarchical beamforming codebook, the plurality of beamforming vectors further including a second beamforming vector and a second angular range occupying a second level of the hierarchical beamforming codebook, the searching of the hierarchical beamforming codebook includes searching from the first level of the hierarchical beamforming codebook to the second level of the hierarchical beamforming codebook by at least selecting, based at least on a first posterior probability an angle-of-arrival of the signal from the second device being in the first angular range, the first beamforming vector before selecting, based at least on a second posterior probability of the angle-of-arrival of the signal from the second device being in the second angular range, the second beamforming vector as the beamforming vector; and establishing, based at least on the beamforming vector, the communication link between the first device and the second device.

* * * * *

UNITED STATES PATENT AND TRADEMARK OFFICE
CERTIFICATE OF CORRECTION

| | |
|---|---|
| PATENT NO. | : 11,736,164 B2 |
| APPLICATION NO. | : 17/085961 |
| DATED | : August 22, 2023 |
| INVENTOR(S) | : Chiu et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this
Twelfth Day of November, 2024

*Katherine Kelly Vidal*

Katherine Kelly Vidal
*Director of the United States Patent and Trademark Office*